(12) United States Patent
Gupta et al.

(10) Patent No.: US 10,940,812 B2
(45) Date of Patent: Mar. 9, 2021

(54) SYSTEM AND METHOD FOR FACILITATING COMMUNICATION VIA AN ELECTRONIC INTERFACE OF A VEHICLE

(71) Applicant: SONY CORPORATION, Tokyo (JP)

(72) Inventors: Manish Gupta, Bengaluru (IN); Samiran Sarkar, Bengaluru (IN); Pramod Chintalapoodi, San Diego, CA (US); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 280 days.

(21) Appl. No.: 14/930,271

(22) Filed: Nov. 2, 2015

(65) Prior Publication Data

US 2017/0120846 A1 May 4, 2017

(51) Int. Cl.
| | |
|---|---|
| *B60R 16/023* | (2006.01) |
| *H04W 4/80* | (2018.01) |
| *H04W 4/48* | (2018.01) |
| *H04W 4/02* | (2018.01) |
| *H04L 29/08* | (2006.01) |
| *B60R 25/20* | (2013.01) |

(52) U.S. Cl.
CPC ............ *B60R 16/023* (2013.01); *B60R 25/20* (2013.01); *H04L 67/12* (2013.01); *H04W 4/023* (2013.01); *H04W 4/48* (2018.02); *H04W 4/80* (2018.02)

(58) Field of Classification Search
CPC .......... H04W 4/04; H04W 4/48; H04W 4/80; H04W 4/023; H04L 67/12; G06Q 30/02; B60R 25/2018; B60R 2025/1016; B60R 16/023; G07C 5/08
USPC ............................................. 701/2; 705/14.1
See application file for complete search history.

(56) References Cited

U.S. PATENT DOCUMENTS

| | | | |
|---|---|---|---|
| 6,766,233 B2 * | 7/2004 | Odinak .................. | B60R 11/02 340/426.1 |
| 7,650,230 B1 * | 1/2010 | Laverick ................ | G01C 21/26 361/679.01 |
| 2002/0160793 A1 * | 10/2002 | Pradhan ................. | G06Q 30/02 455/466 |

(Continued)

FOREIGN PATENT DOCUMENTS

| | | |
|---|---|---|
| JP | 2005-309546 A | 11/2005 |
| JP | 2008-070989 A | 3/2008 |

(Continued)

OTHER PUBLICATIONS

Office Action for JP Patent Application No. 2018-517352, dated Oct. 13, 2020, 09 pages of English Translation and 09 pages of Office Action.

*Primary Examiner* — Isaac G Smith
(74) *Attorney, Agent, or Firm* — Chip Law Group

(57) ABSTRACT

Various aspects of a system and method to facilitate communication via an electronic interface of a vehicle are disclosed herein. In accordance with an embodiment, the method includes receipt of information from a first electronic device by an electronic control unit (ECU) via the electronic interface of the vehicle. The information is received by use of a first communication protocol. The first electronic device is in a first proximity range of the electronic interface of the vehicle. One or more correspondent actions is performed by the ECU based on the received information and a preference of a user associated with the vehicle.

7 Claims, 12 Drawing Sheets

(56) References Cited

U.S. PATENT DOCUMENTS

| | | | |
|---|---|---|---|
| 2007/0268110 A1* | 11/2007 | Little | B60R 25/2072 340/5.62 |
| 2007/0288127 A1* | 12/2007 | Haq | B60R 25/10 701/2 |
| 2008/0228394 A1* | 9/2008 | Fukuda | G01C 21/26 701/532 |
| 2012/0164989 A1* | 6/2012 | Xiao | H04L 67/12 455/414.1 |
| 2012/0282908 A1* | 11/2012 | Nicolini | H04W 4/04 455/418 |
| 2014/0066091 A1* | 3/2014 | Varoglu | G01S 19/10 455/456.1 |
| 2017/0116804 A1* | 4/2017 | Bae | G07C 9/00896 |

FOREIGN PATENT DOCUMENTS

| | | |
|---|---|---|
| JP | 2009-065446 A | 3/2009 |
| WO | 2002/072389 A1 | 9/2002 |

\* cited by examiner

SYSTEM AND METHOD FOR FACILITATING COMMUNICATION VIA AN ELECTRONIC INTERFACE OF A VEHICLE

FIELD

Various embodiments of the disclosure relate to a system and method to facilitate communication via an electronic interface. More specifically, various embodiments of the disclosure relate to system and method for communication with electronic devices via an electronic interface of a vehicle.

BACKGROUND

Advancements in the field of communication technology, information technology, automotive technology, and other interlinked technologies, have led to a technological convergence in the development of intelligent vehicle systems and solutions. In certain scenarios, when a vehicle is towed away, impounded, or clamped, it may cause a major inconvenience for a vehicle owner. For instance, the vehicle may be impounded when it is found abandoned by a roadside or left unattended in a crowded place for a long time. Further, when a vehicle is parked in a parking restricted zone or parked in an undesired manner, it may cause inconvenience to other road users. Efforts to find contact details of the vehicle owner by use of a license plate may be tedious, and may not be needed by an enforcement officer in most of the cases.

In certain other scenarios, a vehicle user may pay for a parking receipt to park the vehicle on a roadside. In such a scenario, it is observed that the vehicle user usually attaches the parking receipt to the vehicle for a parking enforcement officer to confirm. At times, the parking receipt may not be visible to the enforcement officer, which may result in the imposition of a fine. In yet another scenario, the parking enforcement officer may place a ticket, such as a parking ticket, between a wiper and a windshield of the vehicle. Such tickets may be vulnerable to bad weather, such as rain or strong winds. Further, penalty may be imposed when such tickets are lost.

In yet another scenario, fliers distributed for advertisement purpose often irritate a vehicle user as they may restrict visibility and may cause disturbance during a drive. Because of these issues, the vehicle user sometimes loses information that may be important or may be of personal interest to the vehicle user. Thus, in view of the above issues, a smart technological solution may be required that saves time, effort, and increases convenience of both the enforcement officers and the vehicle user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to facilitate communication via an electronic interface of a vehicle substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1A:
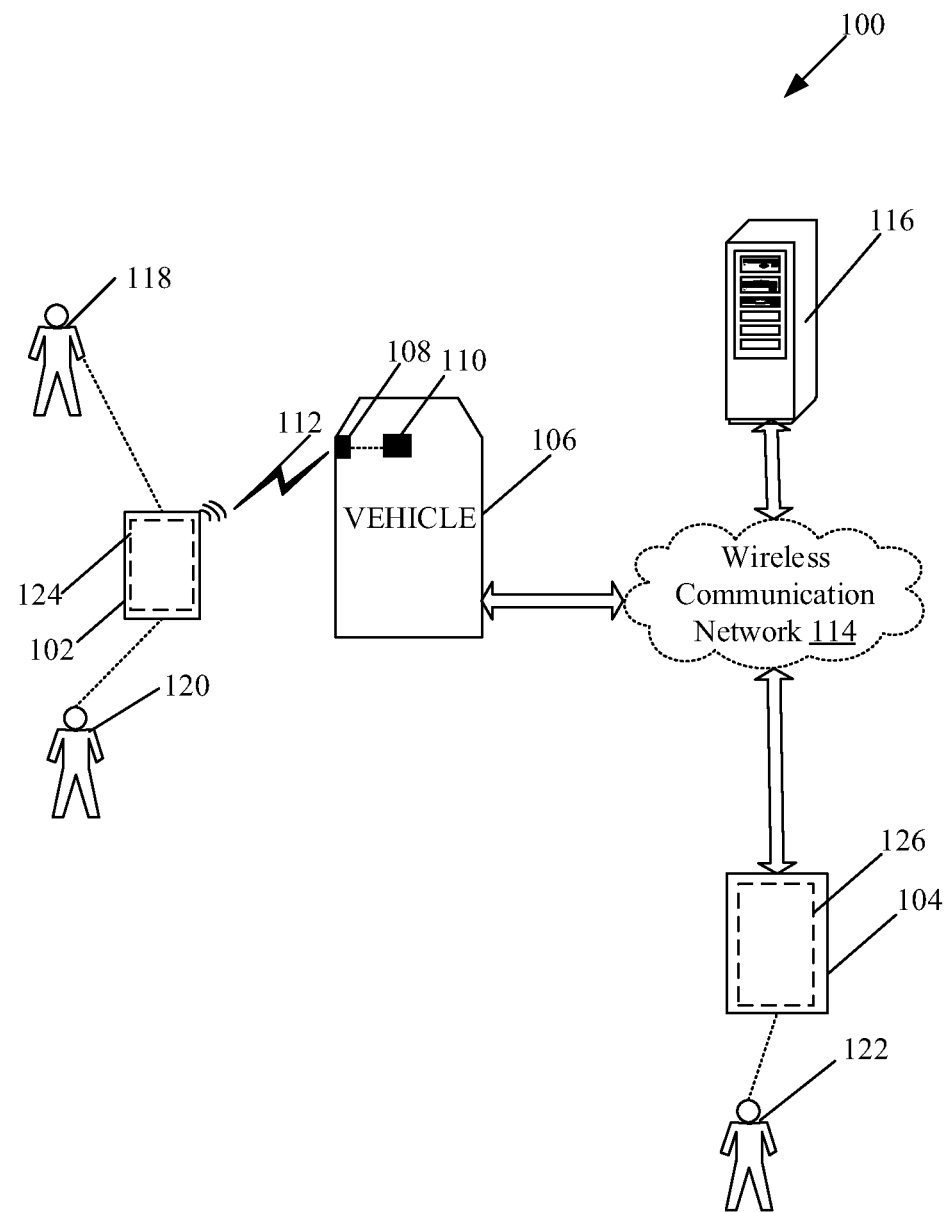
FIG. 1A is a block diagram that illustrates a network environment to facilitate communication via an electronic interface of a vehicle, in accordance with an embodiment of the disclosure.

The following described implementations may be found in the disclosed system and method to facilitate communication via an electronic interface of a vehicle. Exemplary aspects of the disclosure may comprise a method that may receive information from a first electronic device by use of a first communication protocol via the electronic interface. The information may be received at an electronic control unit (ECU) of the vehicle that may be communicatively coupled with the electronic interface. The first communication protocol may be a near field communication (NFC) protocol or BLUETOOTH™. The first electronic device may be in a first proximity range of the electronic interface of the vehicle. One or more corresponding actions may be performed based on the received information and a preference of a user associated with the vehicle.

In accordance with an embodiment, the received information may comprise an identifier of the first electronic device, a requestor type, contact information associated with the first electronic device, an electronic parking ticket, an electronic flier, an electronic parking receipt, and/or a custom message intended for the user associated with the vehicle. The received information may be analyzed based on pre-configured preferences of the user associated with the vehicle. A request type may be determined based on the analysis of the received information. The request type may correspond to a request to communicate with the user associated with the vehicle. The request type may further correspond to a request to check the electronic parking receipt, the request to issue the electronic parking ticket for the vehicle, a request to communicate the electronic flier to the vehicle, a notice corresponding to a parking violation, and/or a request to move the vehicle to a second location from a first location.

In accordance with an embodiment, the received information may be stored in a corresponding pre-defined template. The analyzed information or the stored information may be communicated to a second electronic device by use of a second communication protocol. The second electronic device may be in a second proximity range from the electronic interface of the vehicle. The second communication protocol may be a cellular communication protocol, BLUETOOTH™, a wireless fidelity (Wi-Fi) protocol, or a dedicated short-range communication (DSRC) protocol.

In accordance with an embodiment, an audio, visual, and/or haptic response that corresponds to an indication of success or failure of receipt of the information from the first electronic device may be generated by the ECU. A reminder to extend expiry of a parking receipt to may be dynamically communicated to the second electronic device by use of the second communication protocol. The reminder may be communicated based on the analysis of the received information. In accordance with an embodiment, the electronic interface and/or the ECU may be installed at an outside rear view mirror (ORVM) or a dashboard of the vehicle.

In accordance with an embodiment, an authorization request may be communicated to the second electronic device based on the analyzed received information by use of the second communication protocol. An acknowledgement may be received from the second electronic device that may indicate whether the authorization request is accepted or rejected.

In accordance with an embodiment, the first electronic device may communicate with the second electronic device via the electronic interface of the vehicle without knowledge of contact information of the second electronic device associated with the user. A secure two-way communication between the first electronic device and the second electronic device may be facilitated by the ECU by use of the electronic interface of the vehicle. The secure two-way communication may be established by the ECU by use of a plurality of different communication protocols.

In accordance with an embodiment, permission from a second electronic device may be received at the ECU via the electronic interface to move the vehicle from a first location to a second location within a pre-determined distance range. The permission may be further communicated to the first electronic device by the ECU by use of the electronic interface based on the determined request type. A locked door of the vehicle may be remotely unlocked to permit the movement of the vehicle.

FIG. 1A is a block diagram that illustrates a network environment for communication of a message to a vehicle, in accordance with an embodiment of the disclosure. With reference to FIG. 1, there is shown a network environment 100. The network environment 100 may include one or more electronic devices, such as a first electronic device 102, a second electronic device 104, and a vehicle 106. The vehicle 106 may include a wireless communication system 108 that may be an electronic interface of the vehicle 106. The vehicle 106 may further include an electronic control unit (ECU) 110 that may be communicatively coupled to the wireless communication system 108. There is further shown a communication channel 112, a wireless communication network 114, a server 116, and one or more users, such as a parking enforcement officer 118, a flier distributor 120, and a vehicle user 122. There is further shown a requestor application 124 and a vehicle user application 126 associated with the first electronic device 102 and the second electronic device 104, respectively.

The first electronic device 102 may comprise suitable logic, circuitry, interfaces, and/or code that may be configured to establish communication with an electronic interface, such as the wireless communication system 108 of the vehicle 106. The wireless communication system 108 may include a near-field communication (NFC) circuitry. The communication may be established via the communication channel 112. The first electronic device 102 may also include a near-field communication (NFC) circuitry. The requestor application 124 may be pre-installed at the first electronic device 102. The first electronic device 102 may be configured to receive an input to launch the requestor application 124. The requestor application 124 may render one or more user interfaces (UIs) at the first electronic device 102. The one or more UIs of the requestor application 124 may be used to enter, edit, update, and/or store information of a requestor, such as the parking enforcement officer 118 and the flier distributor 120. The one or more UIs of the requestor application 124 may be configured to display information received from the ECU 110 or the second electronic device 104.

The second electronic device 104 may comprise suitable logic, circuitry, interfaces, and/or code that may be configured to establish communication with the ECU 110 via the wireless communication system 108, by use of the wireless communication network 114. The vehicle user application 126 may be pre-installed at the second electronic device 104. The first electronic device 102 may be configured to receive an input to launch the vehicle user application 126 to pre-configure preferences of the vehicle user 122. The vehicle user application 126 may render one or more UIs at the second electronic device 104. The one or more UIs of the vehicle user application 126 may be used to enter, edit, update, and/or store information of the vehicle user 122. The one or more UIs of the vehicle user application 126 may be configured to display information received from the ECU 110 via the wireless communication system 108 or the first electronic device 102. Examples of the first electronic device 102 and the second electronic device 104 may include, but are not limited to, a smartphone, a smart-glass, a smart-watch, a tablet computer, and/or other portable computing device.

The vehicle 106 may comprise the ECU 110 that may be configured to facilitate communication between the first electronic device 102 and the second electronic device 104, via the wireless communication system 108. Examples of the vehicle 106 may include, but are not limited to, a motor vehicle, a hybrid vehicle, and/or a vehicle that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

The wireless communication system 108 may comprise suitable logic, circuitry, interfaces, and/or code that may be configured to communicate with one or more external devices, such as first electronic device 102, the second electronic device 104, and one or more cloud servers, such as the server 116. The communication with the first electronic device 102 may occur via the communication channel 112. The communication with the second electronic device 104 and the server 116 may occur via the wireless communication network 114. The wireless communication system 108 may include, but is not limited to, an antenna, a radio frequency (RF) transceiver, a near field communication (NFC) circuitry, a telematics unit, a one or more amplifiers, one or more oscillators, a digital signal processor, a coder-decoder (CODEC) chipset, and/or a subscriber identity module (SIM) card. The wireless communication system 108 may communicate via wireless communication by use of the communication channel 112 and/or the wireless communication network 114.

The ECU 110 may comprise suitable logic, circuitry, interfaces, and/or code that may be configured to analyze information received from the first electronic device 102. The received information may be analyzed based on pre-configured preferences of a user, such as the vehicle user 122, associated with the vehicle 106. The ECU 110 may be configured to access vehicle data of the vehicle 106 or communicate one or more control commands to other ECUs, components, or systems of the vehicle 106. The vehicle data and the one or more control commands may be communicated via an in-vehicle network, such as a vehicle area network (VAN), and/or in-vehicle data bus, such as a controller area network (CAN) bus. In accordance with an embodiment, the ECU 110216 may correspond to the electronic interface of the vehicle 106. The ECU 110 may be installed at the ORVM, a dashboard, or an area at an outer surface of the vehicle 106.

The communication channel 112 may refer to a medium through which the first electronic device 102 may communicate with the vehicle 106 that is within a first proximity range. The first electronic device 102 may communicate with the vehicle 106 by use of a first communication protocol, such as a short-range wireless communication protocol. Examples of the communication channel 112 may include, but are not limited to, a near field communication (NFC), a two-way radio frequency network (such as a BLUETOOTH™ based network), or a capacitive coupling based data communication through projected capacitive touch panels located at the first electronic device 102 and the wireless communication system 108 of the vehicle 106. Examples of the first communication protocol, may include, but are not limited to, NFC communication protocol, ZigBee protocol, infrared (IR) protocol, capacitive coupling based data transfer protocol, and/or BLUETOOTH™ (BT) communication protocols.

The wireless communication network 114 may refer to a medium through which the vehicle 106, particularly the wireless communication system 108 of the vehicle 106, may communicate with the second electronic device 104. The second electronic device 104 may communicate with the wireless communication system 108 of the vehicle 106, by use of a second communication protocol in a second proximity range. The wireless communication network 114 may further include a medium through which one or more electronic devices, such as the second electronic device 104, may communicate with a server 116. Examples of the wireless communication network 114 may include, but are not limited to, a cellular network, such as a long-term evolution (LTE) network, a Wireless Fidelity (Wi-Fi) network, a Wireless Local Area Network (WLAN), the Internet, a dedicated short-range communication (DSRC) network, a mobile ad-hoc network (MANET), a vehicular ad-hoc network (VANET), and/or a Metropolitan Area Network (MAN). Examples of the second communication protocol, such as a wireless communication protocol, may include but are not limited to cellular communication protocols, such as Long-term Evolution (LTE), a wireless fidelity (Wi-Fi) protocol, a DSRC protocol, IEEE 802.11, 802.11 p, 802.15, 802.16, 1609, Worldwide Interoperability for Microwave Access (Wi-MAX), Wireless Access in Vehicular Environments (WAVE), Transmission Control Protocol and Internet Protocol (TCP/IP), User Datagram Protocol (UDP), Hypertext Transfer Protocol (HTTP), ZigBee, EDGE, and/or BLUETOOTH™ (BT) communication protocols.

The server 116 may comprise suitable logic, circuitry, interfaces, and/or code that may be configured to receive requests from one or more subscribed devices, such as the first electronic device 102 and the second electronic device 104. The server 116 may be configured to store a database of identifiers (IDs) of authorized personnel, such as the parking enforcement officer 118. The server 116 may be implemented by use of several technologies that are well known to those skilled in the art.

In operation, the first electronic device 102 may be in a first proximity range to the wireless communication system 108 of the vehicle 106. The first electronic device 102 may be configured to communicate information, such as a request, to the ECU 110 of the vehicle 106 via the wireless communication system 108 in the first proximity range. The communicated information corresponds to information pre-configured at the first electronic device 102 by use of the requestor application 124. The pre-configuration may be performed by a requestor, such as the parking enforcement officer 118 or the flier distributor 120.

In accordance with an embodiment, the ECU 110 may be configured to receive information from the first electronic device 102 when the first electronic device 102 is detected in the first proximity range, such as the NFC range, of the wireless communication system 108. The information from the first electronic device 102 may be received via the communication channel 112. The ECU 110 may be configured to analyze the received information based on pre-configured preferences of a user, such as the vehicle user 122 or other user, associated with the vehicle 106. The preferences of the vehicle user 122 may be pre-configured by use of the vehicle user application 126.

In accordance with an embodiment, the ECU 110 may be configured to determine a request type, based on the analysis of the received information. The request type may correspond to a request to communicate with the vehicle user 122, associated with the vehicle 106 (as shown in FIG. 4). The request type may correspond to a request to check an electronic parking receipt, a request to issue an electronic parking ticket for the vehicle 106, a request to communicate an electronic flier for the vehicle 106 (shown in FIG. 3), a notice that corresponds to a parking violation, and/or a request to move the vehicle 106 from a first location to a second location.

In accordance with an embodiment, the ECU 110 may be configured to perform one or more corresponding actions based on the received information and a preference of the vehicle user 122 associated with the vehicle 106. The one or more corresponding actions may be performed further based on the analysis of the received information and/or the determined request type. In accordance with an embodiment, the ECU 110 may be configured to generate an audio, visual, and/or haptic response to indicate success or failure of the receipt of the information from the first electronic device 102. The ECU 110 may be configured to communicate the analyzed information to the second electronic device 104, via the wireless communication system 108. The communication may occur by use of the wireless communication network 114. The second electronic device 104, associated with the vehicle user 122, may be in a second proximity range of the wireless communication system 108 of the vehicle 106.

In certain instances, the wireless communication system 108 (such as the electronic interface) may be implemented in a distributed manner. For example, the wireless communication system 108 may be implemented as a NFC-enabled device that may be installed at an outer surface, such as a windshield, of the vehicle 106. In such instances, the NFC-enabled device may be communicatively coupled to the ECU 110, via the in-vehicle network or the communication channel 112. The information from the first electronic device 102 may be received by the NFC-enabled device when the first electronic device 102 is in the first proximity range of the NFC-enabled device for a short-range wireless communication (such as NFC range). The received information may then be transmitted to the ECU 110 for further analysis. In such an embodiment, another wireless communication system, such as a telematics unit, may be installed within interior circuitry of the vehicle 106. The ECU 110 may be configured to communicate with the second electronic device 104 in the second proximity range, via the other wireless communication system of the vehicle 106 for a short-, medium- or long-range wireless communication (such as BLUETOOTH™ range, Wi-Fi range, cellular communication, or via Internet by use of the wireless communication network 114). Alternatively, in accordance with an embodiment, the wireless communication system 108 may be implemented as a single unit or communication system that may comprise functionalities to communicate with both the first electronic device 102 and the second electronic device 104 under the control of the ECU 110. In other words, the operations performed by the NFC-device and the other wireless communication system, as described above, may be implemented in the same wireless communication system 108.

In accordance with an embodiment, the ECU 110 may be configured to facilitate a secure, two-way communication between the first electronic device 102 and the second electronic device 104, via the wireless communication system 108 of the vehicle 106. The secure, two-way communication may be established by the ECU 110, by use of a plurality of different communication protocols, such as the first communication protocol and the second communication protocol.

In accordance with an embodiment, the ECU 110 may be configured to communicate an authorization request to the second electronic device 104 based on the analysis of the received information. The authorization request may be communicated via the wireless communication system 108 by use of the wireless communication network 114. The ECU 110 may be configured to receive an acknowledgement from the second electronic device 104, via the wireless communication system 108, by use of the wireless communication network 114. The acknowledgement may indicate whether the authorization request is accepted or rejected.

In accordance with an embodiment, the ECU 110 may be configured to store the received information at the vehicle 106. The received information may be stored in a pre-defined template that corresponds to the type or content of the information received. For example, the electronic parking ticket for the vehicle 106 or the electronic flier for the vehicle 106, may be stored at the vehicle 106 based on the analysis of the received information.

Figure 1B:
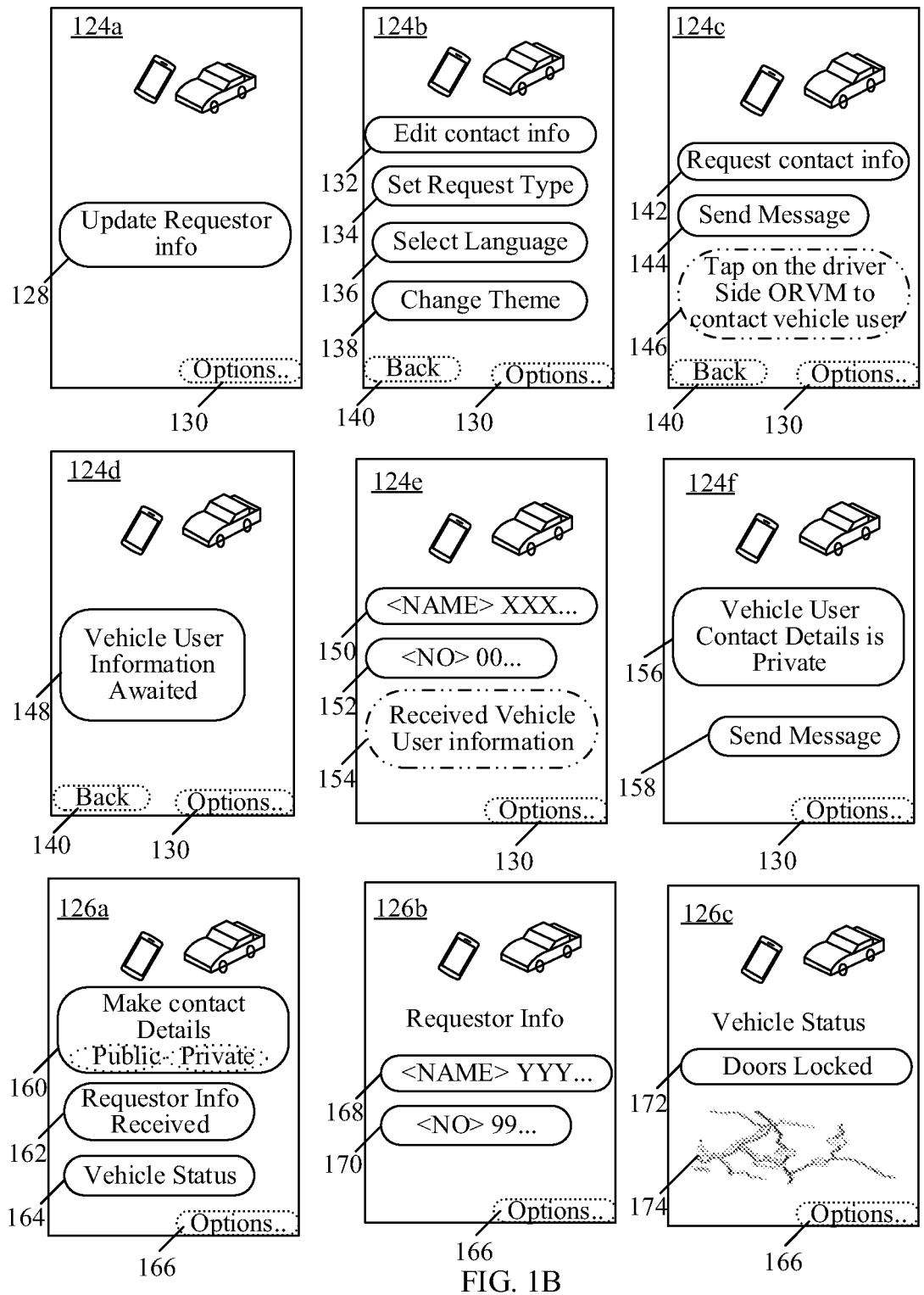
FIG. 1B illustrates one or more exemplary user interfaces rendered at one or more electronic devices to facilitate communication, in accordance with an embodiment of the disclosure.

FIG. 1B illustrates one or more exemplary user interfaces rendered at one or more electronic devices to facilitate communication, in accordance with an embodiment of the disclosure. FIG. 1B is explained in conjunction with elements from FIG. 1A. With reference to FIG. 1B, there is shown one or more user interfaces (UIs), such as UIs 124*a* to 124*f*, of the requestor application 124 that may be rendered at the first electronic device 102. There is further shown one or more other UIs, such as UIs 126*a* to 126*c*, which may be rendered at the second electronic device 104.

With reference to FIG. 1B, the various UIs 124*a* to 124*f* may be used to facilitate interactions of a user, such as the parking enforcement officer 118 or the flier distributor 120, with the first electronic device 102. For example, the UI 124*a* may be used to update the requestor information associated with a requestor type, at the first electronic device 102, by use of a UI element 128 of the UI 124*a*. The requestor information may comprise contact information, such as mobile number, device identifier, name of the requester, or a unique ID associated with the requestor. Examples of the requestor type may include, but are not limited to, the parking enforcement officer 118, the flier distributor 120, a parking receipt checker, a traffic cop, and/or other users associated with the first electronic device 102. A UI element 130 may be used to render various other UIs, such as the UIs 124*b* and the UI 124*c*, or other options to explore the functionalities of the requestor application 124.

The UI 124*b* may be used to edit or select user preferences of the requestor, such as the parking enforcement officer 118. A UI element 132 of the UI 124*b* may be used to edit the contact information of the requestor. A UI element 134 of the UI 124*b* may be used to set the request type at the requestor application. In accordance with an embodiment, the request type correspond to a request to communicate with the vehicle user 122, associated with the vehicle 106, a request to check an electronic parking receipt, or a request to issue an electronic parking ticket for the vehicle 106. The request type may correspond to a request to communicate an electronic flier for the vehicle 106, a notice that corresponds to a parking violation, and/or a request to move the vehicle 106 from a first location to a second location.

The update and configuration of the information associated with the requestor may be a one-time activity. When the information associated with the requestor in one or more mandatory fields, such as the requestor type, the mobile number of the requestor, and/or the unique ID associated with the requestor is updated, and the preferences are selected, the first electronic device 102 may be configured to communicate a verification request of an identity of the requestor, such as the parking enforcement officer 118, to a central server, such as the server 116. The server 116, in conjunction with the database of IDs of authorized personnel, may be configured to verify the identity of the requestor. The server 116 may send a verification confirmation or rejection message to the first electronic device 102. The preferences of the requestor, such as a language preference of the requestor, may be set by use of a UI element 136 of the UI 124*b*. Similarly, visualization preferences, such as themes, fonts, color, background or foreground image, or other visualization changes, may be performed by the requestor by use of a UI element 138. A UI element 140 may be used to navigate back to a previously visited UI, such as the UI 124*a*, whereas the UI element 130 may be used to navigate to other UIs as described above.

The UI 124*c* may display one or more UI elements, such as a UI element 142 ("Request contact info") and/or a UI element 144 ("Send Message"), when the requestor, such as the parking enforcement officer 118, associated with the first electronic device 102 wants to communicate with the vehicle user 122 of the vehicle 106. The parking enforcement officer 118 may select the UI element 142 of the UI 124*c* to request contact information from the vehicle user 122 via the wireless communication system 108 of the vehicle 106. The parking enforcement officer 118 may use the UI element 144 of the UI 124c to send a message to the vehicle user 122 via the wireless communication system 108 of the vehicle 106. Alternatively, the parking enforcement officer 118 may tap the first electronic device 102 at the wireless communication system 108, such as the NFC-enabled device, of the vehicle 106. The wireless communication system 108 may establish a communication with the ECU 110 of the vehicle 106. In such a case, one or more pre-stored customized messages may be automatically communicated to the vehicle user 122.

The UI 124d may comprise a UI element 148 that may display a current status of the communicated message to the vehicle user 122. For example, a message, such as "Vehicle User Information Awaited", may be displayed at a time point when information associated with the vehicle user 122 is awaited, subsequent to the tap operation. The UI 124e may comprise UI elements 150 to 154 to display contact details of the vehicle user 122 when the contact details of the vehicle user 122 are stored in the vehicle 106 and not restricted to be provided to the first electronic device 102. In this case, the contact details of the vehicle user 122 are stored in a memory of the vehicle 106 and configured as "Public". The UI element 154 may display a current and/or updated status of the tap operation. For example, a message, such as "Received Vehicle User Information", may be displayed at a time point when information associated with the vehicle user 122 is received. On the other hand, the UI 124f may comprise a UI element 156 that may be rendered to display an informative message when the contact details of the vehicle user 122 are restricted and configured as "Private".

The parking enforcement officer 118 may use a UI element 158, such as a menu item "Send Message", to establish communication with the second electronic device 104 without knowledge of the contact details of the vehicle user 122. When the UI element 158 (such as the menu item "Send Message") is selected on the first electronic device 102, a message is sent to the vehicle 106 via the wireless communication system 108. The ECU 110 of the vehicle 106 determines a setting of the contact details as "Private", and sends information that the contact details of the vehicle user 122 cannot be shared, to the first electronic device 102. The ECU 110 also communicates via the wireless communication system 108 to the second electronic device 104 that the requestor is seeking contact details of the vehicle user 122. The vehicle user 122 may then choose to communicate with the requestor in a concealed manner without sharing the contact details (of the vehicle user 122) via the wireless communication system 108 of the vehicle 106. Thus, the vehicle 106 acts as a communication gateway between the first electronic device 102 of the requestor and the second electronic device 104 of the vehicle user 122.

The UI 126a, at the second electronic device 104, may display the receipt of the information from the first electronic device 102 when the second electronic device 104 receives the information from the first electronic device 102. For example, displayed information, as illustrated by a UI element 162 of the UI 126a, may be information of the requestor that is received at the second electronic device 104. When the UI element 162 is selected by the requestor, such as the vehicle user 122, information of the requestor is displayed, as illustrated in the UI 126b. The contents of the information of the requestor can be name of the requestor, as illustrated by a UI element 168 of the UI 126b, and contact information, such as mobile number or email address of the requestor, as illustrated by a UI element 170 of the UI 126b. In instances when the received information from the first electronic device 102 includes a request of contact details, the UI 126a may render UI elements, such as a UI element 160 that may include sub-UI elements, such as software buttons "Private" and "Public", to set a restriction level for the contact details of the vehicle user 122.

The UI 126a may further display the status information of the vehicle 106 as illustrated by a UI element 164 in the UI 126a. When the UI element 164 is selected by the vehicle user 122, vehicle status related information such as location or door lock/unlock status of the vehicle 106 is displayed, as illustrated by a UI element 172 of the UI 126c. The UI 126c may display the vehicle status information, as illustrated by a UI element 172 of the UI 126c, of the vehicle 106. The UI 126c may display a map 174 to locate a current geographical position of the vehicle 106.

The above example shows various UIs of the requestor application 124 and the vehicle user application 126 related to the request to communicate with vehicle user 122. Notwithstanding, the visual output and the one or more UIs at the first electronic device 102 and the second electronic device 104 may be presented in any suitable format, without limiting the scope of the disclosure.

Figure 2:
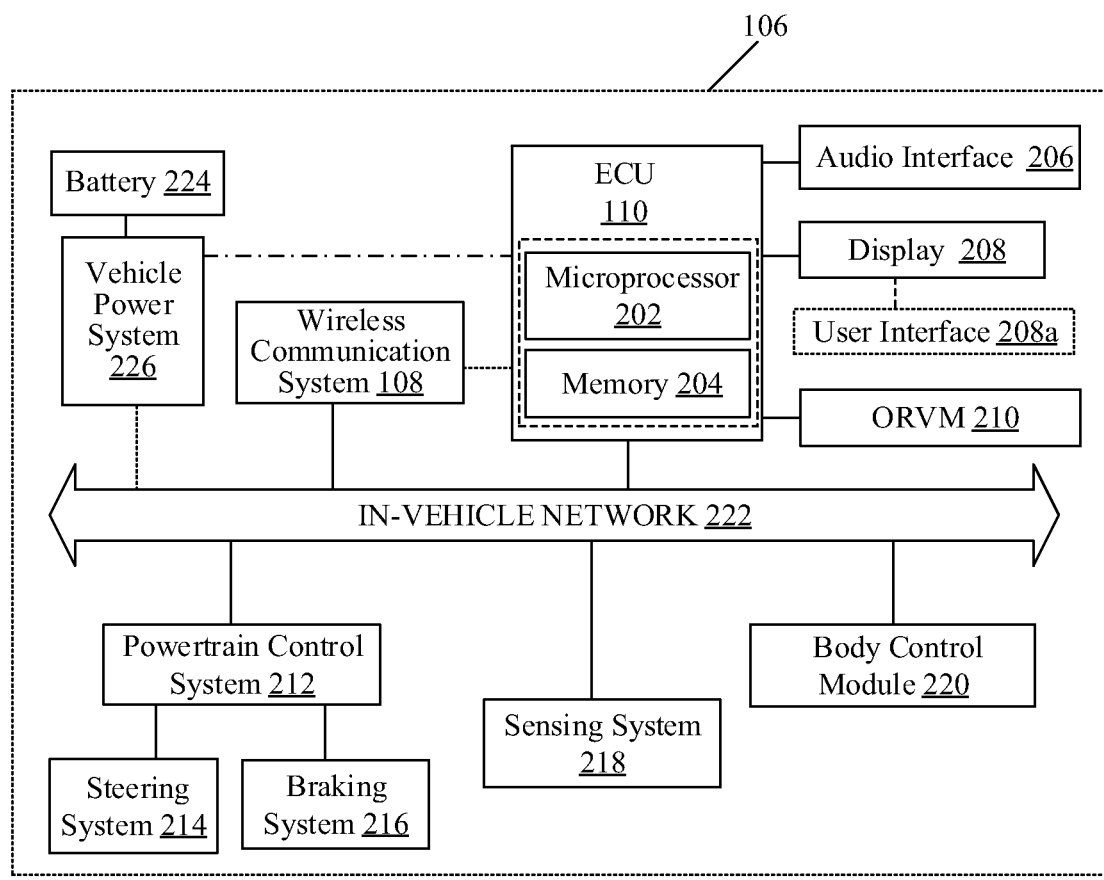
FIG. 2 is a block diagram that illustrates various exemplary components or systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIGS. 1A and 1B. With reference to FIG. 2, there is shown the vehicle 106. The vehicle 106 may comprise the ECU 110 that may include a microprocessor 202 and a memory 204. The vehicle 106 may further comprise the wireless communication system 108, an audio interface 206, a display 208, an outside rear view mirror (ORVM) 210, a powertrain control system 212, a steering system 214, a braking system 216, a sensing system 218, a body control module 220, and an in-vehicle network 222. There is further shown a battery 224 associated with a vehicle power system 226. In accordance with an embodiment, the wireless communication system 108, the audio interface 206, the display 208, and the ORVM 210 may also be associated with the ECU 110. The display 208 may render a user interface (UI) 208a.

The various components or systems may be communicatively coupled to each other, via the in-vehicle network 222, such as a vehicle area network (VAN), and/or an in-vehicle data bus. The microprocessor 202 may be communicatively coupled to the memory 204, the wireless communication system 108, the audio interface 206, the display 208, and the sensing system 218, via the in-vehicle network 222. In accordance with an embodiment, the microprocessor 202 may be operatively connected to the powertrain control system 212 and the body control module 220. It should be understood that the vehicle 106 may also include other suitable components or systems, but for brevity, those components or systems which are used to describe and explain the function and operation of the present disclosure are illustrated herein.

The microprocessor 202 may comprise suitable logic, circuitry, interfaces, and/or code that may be configured to execute a set of instructions stored in the memory 204. The microprocessor 202 may be configured to receive information from the first electronic device 102, via the communication channel 112. Examples of the microprocessor 202 may be an X86-based processor, a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a microcontroller, a central processing unit (CPU), a graphics processing unit (GPU), a state machine, and/or other processors or circuits.

In accordance with an embodiment, wireless communication system 108 may be implemented in a distributed manner. For instance, an NFC device may be provided in the ORVM 210. In such an instance, the microprocessor 202 may be provided in the ECU 110 that may be installed within interior circuitry of the vehicle 106. In such an instance, the NFC device (as the wireless communication system 108) may be communicatively coupled to the microprocessor 202, via the in-vehicle network 222 or the communication channel 112. The information from the first electronic device 102 may be received by the NFC device when the first electronic device 102 is in the first proximity range of the NFC device. The received information may then be transmitted to the microprocessor 202 of the ECU 110, via the in-vehicle network 222, for further analysis. The NFC device and/or the microprocessor 202 may be referred to as an electronic interface of the vehicle 106 that may facilitate communication between the first electronic device 102 and the second electronic device 104.

The memory 204 may comprise suitable logic, circuitry, and/or interfaces that may be configured to store a machine code and/or a set of instructions executable by the microprocessor 202. The memory 204 may be further configured to store user-preferences configured by a user, such as the vehicle user 122. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The audio interface 206 may be connected to a speaker, a chime, a buzzer, or other device that may be operable to generate a sound. The audio interface 206 may also be connected to a microphone or other device to receive a voice input from an occupant of the vehicle 106, such as the vehicle user 122. The audio interface 206 may also be communicatively coupled to the microprocessor 202. The audio interface 206 may be a part of an in-vehicle infotainment (IVI) system or head unit of the vehicle 106.

The display 208 may refer to a display screen to display various types of information to the occupants of the vehicle 106, such as the vehicle user 122. In accordance with an embodiment, the display 208 may be a touch screen display that may receive an input from the vehicle user 122. The vehicle user 122 may provide the input, such as user preferences, via the UI 208*a*. One or more rules related to processing of the received information may be pre-configured by use of the UI 208*a*. The UI 208*a* may be an application-based UI associated with the ECU 110 or the head unit (HU) of the vehicle 106. Examples of the display 208 may include, but are not limited to a heads-up display (HUD) or a head-up display with an augmented reality system (AR-HUD), a driver information console (DIC), a projection-based display, and/or an electro-chromic display. The vehicle 106 may include other input/output (I/O) devices that may be configured to communicate with the microprocessor 202.

The ORVM 210 may refer to a rear view mirror mounted on a side of the vehicle 106. In accordance with an embodiment, the ORVM 210 may comprise the NFC device and/or a proximity sensor. The ORVM 210 may comprise one or more indicator lights that may change color, such as from green to red and vice-versa. The indicator lights may be controlled by the microprocessor 202.

The powertrain control system 212 may refer to an onboard computer of the vehicle 106 that controls operations of an engine and a transmission system (when provided) of the vehicle 106. The powertrain control system 212 may control ignition, fuel injection, emission systems, and/or operations of a transmission system (when provided) and the braking system 216.

The steering system 214 may be associated with the powertrain control system 212. The steering system 214 may include a steering wheel and/or an electric motor (provided for a power-assisted steering) that may be used by the vehicle user 122 to control movement of the vehicle 106 in manual mode or a semi-autonomous mode. In accordance with an embodiment, the movement or steering of the vehicle 106 may be automatically controlled when the vehicle 106 is in autonomous mode. Examples of the steering system 214 may include, but are not limited to, an autonomous steering control, a power-assisted steering system, a vacuum/hydraulic-based steering system, an electro-hydraulic power-assisted system (EHPAS), or a "steer-by-wire" system, known in the art The braking system 216 may be used to stop or slow down the vehicle 106 by application of frictional forces. The braking system 216 may be configured to receive a command from the powertrain control system 212 under the control of the microprocessor 202, when the vehicle 106 is in an autonomous mode or a semi-autonomous mode. In accordance with an embodiment, the braking system 216 may be configured to receive a command from the body control module 220 and/or the microprocessor 202 when the microprocessor 202 preemptively detects an obstacle, road hazards, and/or a movement of the vehicle 106 beyond a pre-determined distance range.

The sensing system 218 may refer to the one or more vehicle sensors to sense or detect the geospatial position of the vehicle 106. The sensing system 218 may include one or more proximity sensors to sense the first proximity range or the second proximity range of the vehicle 106, from external devices, such as the first electronic device 102 or the second electronic device 104. The sensing system 218 may be operatively connected to the microprocessor 202 to provide input signals. One or more communication interfaces, such as a CAN interface, may be provided in the sensing system 218 to connect to the in-vehicle network 222. Examples of the sensing system 218 may include, but are not limited to, the vehicle speed sensor, the odometric sensors, a speedometer, a yaw rate sensor, a global positioning system (GPS), a steering angle detection sensor, a vehicle travel direction detection sensor, a magnometer, an image sensor, a touch sensor, and/or an infrared sensor.

The body control module 220 may refer to another electronic control unit that comprises suitable logic, circuitry, interfaces, and/or code that may be configured to control various electronic components or systems of the vehicle 106, such as a central door locking system. The body control module 220 may be configured to receive a command from the microprocessor 202 to unlock a vehicle door of the vehicle 106. The body control module 220 may relay the command to other suitable vehicle systems or components, such as the central door locking system, for access control of the vehicle 106.

The in-vehicle network 222 may include a medium through which the various control units, components, or systems of the vehicle 106, such as the ECU 110, the wireless communication system 108, the powertrain control system 212, the sensing system 218, and/or the body control module 220, may communicate with each other. In accordance with an embodiment, in-vehicle communication of audio/video data for multimedia components may occur by use of Media Oriented Systems Transport (MOST) multimedia network protocol of the in-vehicle network 222. The in-vehicle network 222 may facilitate access control and/or communication between the ECU 110 and other ECUs, such as a telematics control unit (TCU), of the vehicle 106. Various devices in the vehicle 106 may be configured to connect to the in-vehicle network 222, in accordance with various wired and wireless communication protocols. One or more communication interfaces, such as the CAN interface, a Local Interconnect Network (LIN) interface, may be used by the various components or systems of the vehicle 106 to connect to the in-vehicle network 222. Examples of the wired and wireless communication protocols for the in-vehicle network 222 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The battery 224 may be source of electric power for one or more electric circuits or loads (not shown). For example, the loads may include, but are not limited to various lights, such as headlights and interior cabin lights, electrically powered adjustable components, such as vehicle seats, mirrors, windows or the like, and/or other in-vehicle infotainment system, such as radio, speakers, electronic navigation system, electrically controlled, powered and/or assisted steering, such as the steering system 214. The battery 224 may be a rechargeable battery. The battery 224 may be a source of electrical power to the ECU 110 (shown by dashed lines), the one or more sensors of the sensing system 218, and/or one or more hardware units, such as the display 208, of the in-vehicle infotainment system. The battery 224 may be a source of electrical power to start an engine of the vehicle 106 by selectively providing electric power to an ignition system (not shown) of the vehicle 106.

The vehicle power system 226 may regulate the charging and the power output of the battery to various electric circuits and the loads of the vehicle 106, as described above. When the vehicle 106 is a hybrid vehicle or an autonomous vehicle, the vehicle power system 226 may provide the required voltage for all of the components and enable the vehicle 106 to utilize the battery 224 power for a sufficient amount of time. In accordance with an embodiment, the vehicle power system 226 may correspond to power electronics, and may include a microcontroller that may be communicatively coupled (shown by dotted lines) to the in-vehicle network 222. In such an embodiment, the microcontroller may receive command from the powertrain control system 212 under the control of the microprocessor 202.

In operation, the microprocessor 202 may be configured to detect the first electronic device 102 in a first proximity range of the wireless communication system 108, by use of the proximity sensor. The microprocessor 202 may be configured to receive information from the detected first electronic device 102 via the wireless communication system 108. The information may be received from the detected first electronic device 102 by use of the first communication protocol. The received information may comprise an identifier of the first electronic device 102, the identifier of the requestor, a requestor type, contact information associated with the first electronic device 102, an electronic parking ticket, an electronic flier, an electronic parking receipt, and/or a custom message intended for the vehicle user 122 associated with the vehicle 106.

In accordance with an embodiment, the microprocessor 202 may be configured to analyze the received information based on pre-configured preferences of a user, such as the vehicle user 122, associated with the vehicle 106. The preferences may be pre-configured via the UI 208a. The microprocessor 202 may be further configured to receive an input from the vehicle user 122 to launch the UI 208a at the display 208. The vehicle user 122 may enter contact details, set information as public or private, and/or select language preferences, via the UI 208a.

In accordance with an embodiment, the microprocessor 202 may be configured to receive input, via the UI 208a, to define types and select categories of information that are to be received from external devices, such as the first electronic device 102. For example, the vehicle user 122 may be interested in information associated with certain topics or categories, such as restaurant or real estate, for the electronic fliers. The type definition may correspond to offers, discounts, and/or keywords. Such type definition and category selection may filter undesired information, and enable receipt of information of interest to the vehicle user 122. In accordance with an embodiment, the microprocessor 202 may be configured to store the received information in a corresponding pre-defined template at the memory 204.

In accordance with an embodiment, the microprocessor 202 may be configured to determine a request type based on the analysis of the received information. The request type may correspond to a request to communicate with the vehicle user 122, associated with the vehicle 106, a request to check an electronic parking receipt, or a request to issue an electronic parking ticket for the vehicle 106. The request type may correspond to a request to communicate an electronic flier for the vehicle 106, a notice that corresponds to a parking violation, and/or a request to move the vehicle 106 from a first location to a second location.

In accordance with an embodiment, the microprocessor 202 may be configured to perform one or more corresponding actions based on the analysis of the received information. The microprocessor 202 may be configured to communicate the analyzed information to the second electronic device 104, by use of the wireless communication network 114. Such a communication may occur via the wireless communication system 108. The second electronic device 104 may be in the second proximity range of the wireless communication system 108 of the vehicle 106.

In accordance with an embodiment, when the request type corresponds to a request to communicate with the vehicle user 122 associated with the vehicle 106, the microprocessor 202 may determine whether the information that corresponds to the contact details of the vehicle user 122 is configured as private or public. In an instance when the information that corresponds to the contact details is configured as private, the microprocessor 202 may be configured to facilitate a secure, two-way communication between the first electronic device 102 and a second electronic device 104, via the wireless communication system 108. The first electronic device 102 may communicate with the second electronic device 104 without knowledge of the contact information of the second electronic device 104 associated with the vehicle user 122, under the control of the microprocessor 202.

In an instance when the information that corresponds to the contact details is configured as public, the microprocessor 202 may be configured to directly communicate the information to the first electronic device 102, via the communication channel 112. For example, the parking enforcement officer 118 may tap the first electronic device 102 to the ORVM 210 that may include the NFC device. The NFC device may directly communicate the contact details of the vehicle user 122 to the first electronic device 102. The contact details of the vehicle user 122 may be displayed at the first electronic device 102, via the UI 124e (as shown in FIG. 1B) of the requestor application 124. In another instance, the NFC device may communicate the received information to the microprocessor 202. The microprocessor 202 may then communicate the information stored at the memory 204 to the first electronic device 102, via the NFC device. In accordance with an embodiment, in response to the information received from the first electronic device 102, the microprocessor 202 may directly communicate the information to the first electronic device 102, via the communication channel 112.

In accordance with an embodiment, when the request type corresponds to the request to check the electronic parking receipt, the microprocessor 202 may be configured to communicate an authorization request to the second electronic device 104, via the wireless communication system 108 by use of the wireless communication network 114. The communication of the authorization request may be based on the analysis of the received information. The microprocessor 202 may be configured to receive an acknowledgement from the second electronic device 104, via the wireless communication system 108. The acknowledgement may indicate whether the authorization request is accepted or rejected. For example, when the authorization request is accepted, the indicator light of the ORVM 210 may turn green under the control of the microprocessor 202. Similarly, when the authorization request is rejected, the indicator light may turn red under the control of the microprocessor 202.

In accordance with an embodiment, the microprocessor 202 may be configured to communicate the electronic parking receipt information to the first electronic device 102, via the wireless communication system 108, in response to the acceptance of the authorization request. In an instance, the parking enforcement officer 118 may tap the first electronic device 102 to the ORVM 210 (that may include the NFC device of the wireless communication system 108) when the indicator light is green. In such an instance, the microprocessor 202 may be configured to transmit the electronic parking receipt information to the first electronic device 102, via the NFC device of the wireless communication system 108, based on the input (the tap event) received from the first electronic device 102.

In accordance with an embodiment, when the received information is analyzed to be the electronic parking ticket, the microprocessor 202 may be configured to further analyze the requestor type and the identifier of the first electronic device 102. The microprocessor 202 may be configured to communicate an authorization request to the server 116, via the wireless communication system 108, to validate the identity of the parking enforcement officer 118. The communication of the authorization request to the server 116 may be via the wireless communication network 114, such as the LTE protocol or the Internet. The microprocessor 202 may be configured to store the electronic parking ticket at the memory 204. The electronic parking ticket may be stored when the identity of the parking enforcement officer 118 is validated and the authorization is confirmed.

In accordance with an embodiment, the microprocessor 202 may be configured to communicate the stored information, such as the electronic parking ticket, to the second electronic device 104, via the wireless communication system 108 by use of the wireless communication network 114. The microprocessor 202 may be configured to generate an audio response by use of the audio interface 206, a visual response by use of the one or more indicator lights of the ORVM 210 or the display 208, or a haptic response at the vehicle 106 by use of the one or more vehicle sensors of the sensing system 218. The generation of the audio, visual, and/or haptic responses may indicate success or failure related to the storage of the electronic parking ticket and receipt by the second electronic device 104.

In accordance with an embodiment, the microprocessor 202 may be configured to dynamically communicate a reminder to extend expiry time of the parking receipt to the second electronic device 104, via the wireless communication system 108 by use of the wireless communication network 114. The reminder may be communicated based on the analysis of the received information. The second electronic device 104 may be configured to perform a monetary transaction to pay for the parking ticket or extend the expiry time of the parking receipt by use of the vehicle user application 126. In accordance with an embodiment, the first electronic device 102 may be a NFC-enabled parking meter that may receive confirmation of the payment for the parking ticket.

In an instance, the determined request type of the received information may correspond to the request to move the vehicle 106 from a first location to a second location. In such an instance, the microprocessor 202 may be configured to communicate a permission request to the second electronic device 104, via the wireless communication system 108. The microprocessor 202 may be configured to receive permission from the second electronic device 104 of the vehicle user 122, via the wireless communication system 108. The microprocessor 202 may be configured to further communicate a command associated with the permission to another ECU, such as the body control module 220, of the vehicle 106 to unlock a locked door of the vehicle 106. In accordance with an embodiment, one or more commands, such as those related to the door unlock, the steering wheel unlock, or vehicle ignition may be transmitted to another component or system of the vehicle 106, such as the powertrain control system 212 and/or the steering system 214, via the in-vehicle network 222. Such commands permit the movement of the vehicle 106.

The permission signal may allow movement of the vehicle 106 to the second location within a pre-determined distance range. The permission may be further communicated to the first electronic device 102, via the wireless communication system 108, under the control of the microprocessor 202. The distance travelled by the vehicle 106 may be monitored by use of the one or more vehicle sensors of the sensing system 218. In instances when the microprocessor 202 detects that the vehicle 106 has approached the pre-determined distance range, such as "100 meters", the microprocessor 202 may automatically reduce the speed by use of the braking system 216. The microprocessor 202 may generate various advisory information for the then guest driver, such as the parking enforcement officer 118, by use of the audio interface 206 or the display 208. The advisory information may be a buzzer sound to alert the parking enforcement officer 118 of the approaching pre-determined distance range. For example, one or more audio alerts may be intermittently outputted via the audio interface 206. Examples of the audio alerts may be, "You are permitted to move up to a distance of 100 meters", "You have moved 60 meters out of the permitted 100 meters", and/or "Only 10 meters left of the permitted limit, Please be aware that the car (the vehicle 106) will automatically stop on reaching the limit of 100 meters."

In accordance with an embodiment, when the received information is analyzed to be the electronic flier, the microprocessor 202 may be configured to determine whether content of the received electronic flier corresponds to one or more pre-configured categories and/or types of information. The one or more pre-configured categories and/or types of information may refer to the topics that are of interest to the vehicle user 122. In instances, when the content of the received electronic flier is determined to be similar or within a domain of the pre-configured categories and/or types of information, the received electronic flier may be stored for later view by the vehicle user 122. In instances, when the content of the received electronic flier is determined to be dissimilar or not within a domain of the pre-configured categories and/or type of information, the received electronic flier may not be stored at the vehicle 106.

In accordance with an embodiment, the microprocessor 202 may be configured to dynamically receive the electronic flier when the vehicle 106 passes a certain geo-location, such as an area in the vicinity of a shopping center. The receipt may be via the wireless communication system 108 based on pre-configured preferences of one or more users associated with the vehicle 106.

Figure 3:
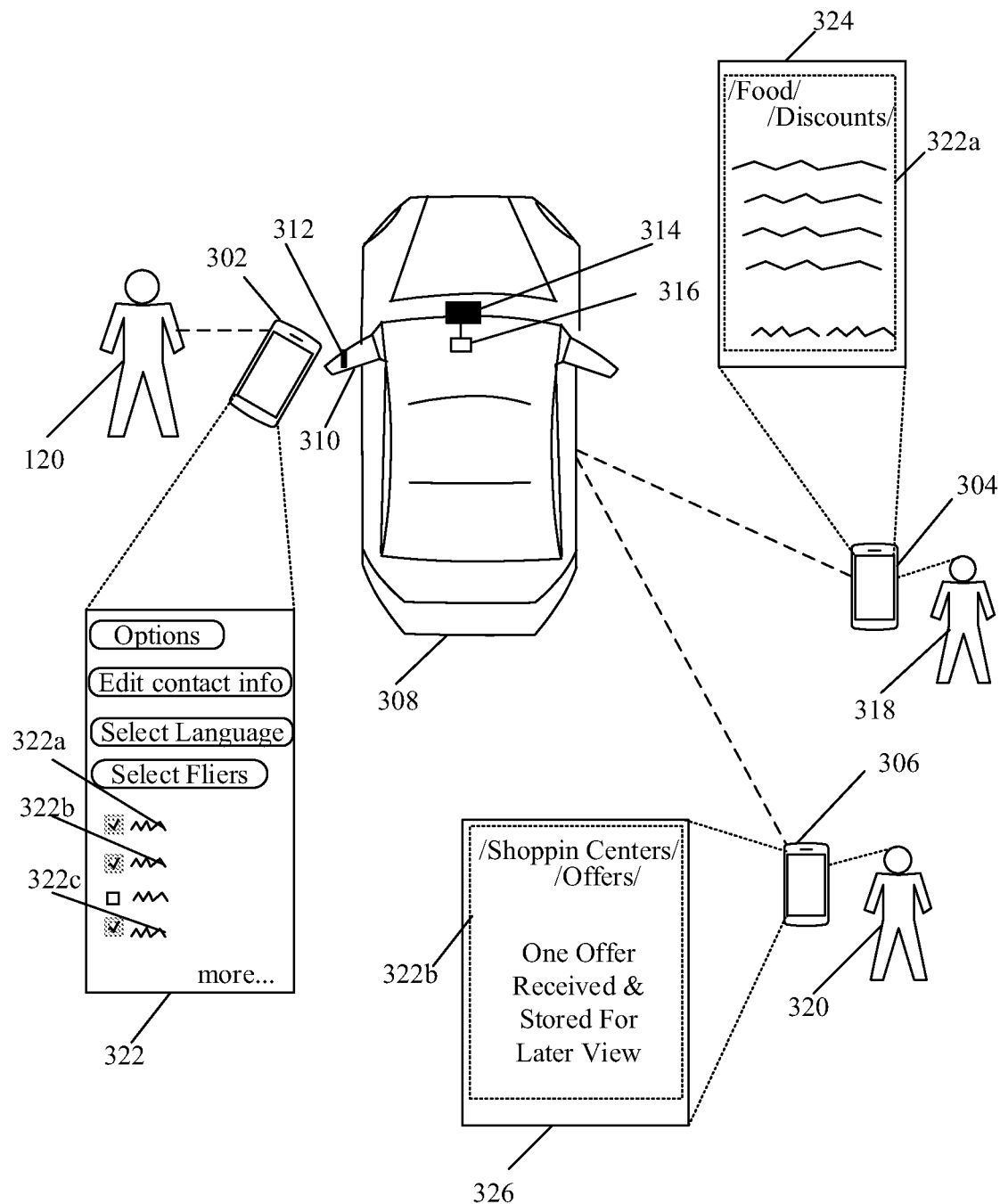
FIG. 3 illustrates a first exemplary scenario for implementation of the disclosed system and method to facilitate communication via an electronic interface of a vehicle, in accordance with an embodiment of the disclosure.
Figure 4:
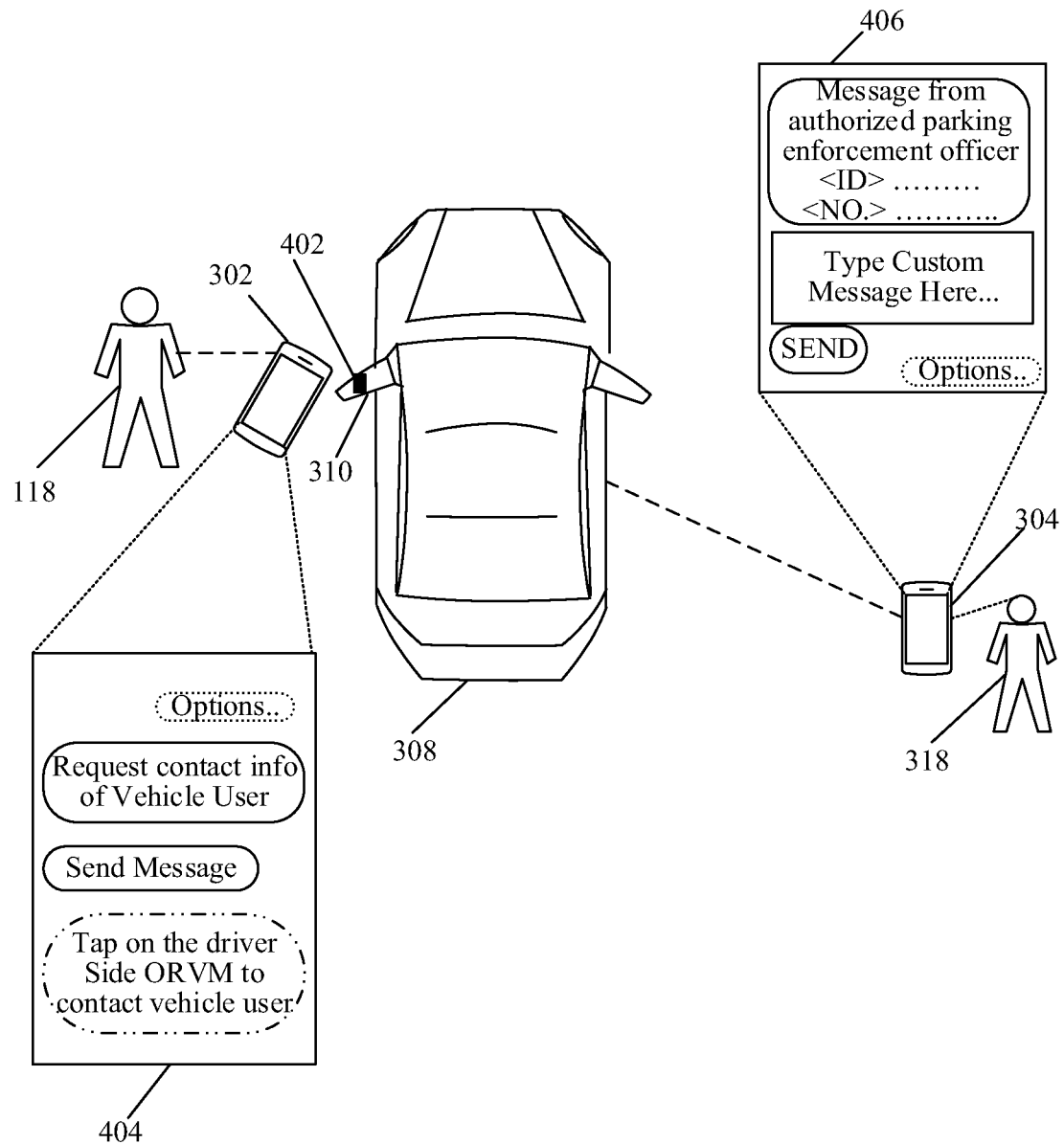
FIG. 4 illustrates a second exemplary scenario for implementation of the disclosed system and method to facilitate communication via an electronic interface of a vehicle, in accordance with an embodiment of the disclosure.

FIG. 3 illustrates a first exemplary scenario for implementation of the disclosed system and method to facilitate communication via an electronic interface of a vehicle, in accordance with an embodiment of the disclosure. FIG. 3 is explained in conjunction with elements from FIGS. 1A, 1B, and 2. With reference to FIG. 3, there is shown a first smartphone 302, a second smartphone 304, and a third smartphone 306, a car 308, an outside rear view mirror (ORVM) 310, an NFC device 312, an ECU 314 and a display 316 of a head unit of the car 308. There is further shown a driver 318 and an occupant 320 associated with the car 308. There is further shown the flier distributor 120 associated with the first smartphone 302. The first smartphone 302, the second smartphone 304, and the third smartphone 306 may launch UIs 322, 324, and 326, respectively.

In accordance with the first exemplary scenario, the first smartphone 302 may correspond to the first electronic device 102, and may have functionalities similar to that of the first electronic device 102 (FIG. 1A). The second smartphone 304 and the third smartphone 306 may have functionalities similar to that of the second electronic device 104 (FIG. 1A). The car 308 may be similar to that of the vehicle 106 (FIG. 1A). The NFC device 312 provided at the ORVM 310 may correspond to the NFC device of the ORVM 210 or the wireless communication system 108 (as described in FIG. 2). In accordance with the first exemplary scenario, the NFC device 312 may be the electronic interface. The NFC device 312 may be communicatively coupled to the ECU 314. The ECU 314 may have functionalities similar to that of the ECU 110 (FIGS. 1 and 2). The display 316 of the head unit may correspond to the display 208 of the vehicle 106. The UI 322 and the UI 324 may correspond to the requestor application 124 and the vehicle user application 126, respectively (as described in FIGS. 1A and 1B). The flier distributor 120 may want to communicate various electronic fliers to the users of the car 308 for advertisement purposes.

In operation, the flier distributor 120 may select one or more electronic fliers, such as electronic fliers 322a, 322b and 322c, via the UI 322, to be communicated to the users of the car 308. The requestor type, contact information, and/or language preference associated with each electronic flier may be pre-configured at the first smartphone 302, via the UI 322. The electronic flier 322a may be an advertisement related to a food discount coupon of a restaurant. The food discount coupon may be valid for a certain date. The electronic flier 322b may be a promotion related to the opening ceremony of a mall, and certain discount offers at the mall for a certain time limit. The electronic flier 322c may be another advertisement related to a deal at a real estate property at a certain geographic location.

In accordance with an embodiment, the NFC device 312 may be configured to receive the electronic fliers 322a, 322b, and 322c. The electronic fliers 322a, 322b and 322c may be received when the flier distributor 120 places the first smartphone 302 near the ORVM 310 that comprises the NFC device 312 to activate communication via the NFC protocol. The received electronic fliers 322a, 322b and 322c may be communicated to the ECU 314 for analysis.

In accordance with an embodiment, the ECU 314 may be configured to determine whether content of the received electronic fliers 322a, 322b and 322c correspond to one or more pre-configured categories and/or types of information. The one or more pre-configured categories and/or types of information may refer to the topics that are of interest to the driver 318 and the occupant 320. In an instance, the driver 318 may pre-configure category as "<Food>" and type as "<discount>" via the UI 324, or a UI (such as the UI 208a (FIG. 2)) via the display 316 of the head unit. Similarly, the occupant 320 may pre-configure category as "<shopping centers>" and type as "<offers>", via the UI 326 or the UI rendered at the display 316. The pre-configured category associated with the driver 318 and/or the occupant 320 are stored in a memory in the car 308.

In accordance with an embodiment, the ECU 314 may be configured to store the electronic fliers 322a and 322b and discard the electronic flier 322c based on preference of the driver 318 and/or the occupant 320 by referring to pre-configured category stored in the memory in the car 308. The ECU 314 may be configured to simultaneously communicate the electronic flier 322a to the second smartphone 304 and the electronic flier 322b to the third smartphone 306 by sending these fliers via a wireless communicating system of the car 308 to the second smartphone 304 and/or the third smartphone 306. The second smartphone 304 may be configured to render the electronic flier 322a together with addition details, such as contact information of the restaurant, via the UI 324. The second smartphone 304 may be configured to set a reminder for the date on which the food discount coupon expires. Similarly, the third smartphone 306 may be configured to receive, but not instantly render the electronic flier 322b as per pre-configured preferences of the occupant 320. Thus, the driver 318 and the occupant 320 associated with the car 308 may receive information deemed important or in accordance with their personal interests.

FIG. 4 illustrates a second exemplary scenario for implementation of the disclosed system and method to facilitate communication via an electronic interface of a vehicle, in accordance with an embodiment of the disclosure. FIG. 4 is explained in conjunction with elements from FIGS. 1A, 1B, 2, and 3. With reference to FIG. 4, there is shown an ECU 402 installed at the ORVM 310 of the car 308. There is further shown an enlarged view of a UI 404 rendered at the first smartphone 302, and another UI 406 rendered at the second smartphone 304.

In accordance with the second exemplary scenario, the first smartphone 302 may be associated with the parking enforcement officer 118. The ECU 402 may be similar to that of the ECU 110 (FIG. 1A and FIG. 2), and may comprise the functionalities of both the NFC device 312 and the ECU 314 (FIG. 3). The UI 404 and the UI 406 may correspond to the one or more UIs of the requestor application 124 and the vehicle user application 126, respectively (as described in FIGS. 1A and 1B).

The car 308 may be parked and left unattended at a first location that may be crowded place. A user, such as the parking enforcement officer 118, may want to contact the driver 318 of the car 308, but may not know the contact details of the driver 318. The driver 318 may not be the owner of the car 308.

In operation, the parking enforcement officer 118 may pre-configure a request to be communicated to the driver 318 of the car 308, via the UI 404. When the first smartphone 302 is detected within the first proximity range to the ECU 402, the ECU 402 may be configured to receive information from the first smartphone 302. The information may be received by use of the first communication protocol, such as the NFC protocol. The received information may comprise an identifier of the first smartphone 302, identity information of the parking enforcement officer 118, and the request to contact a user, such as the driver 318, of the car 308. The ECU 402 may be configured to analyze the received information, based on pre-configured preferences of the driver 318 associated with the vehicle 106. The ECU 402 may be configured to determine a request type, based on the analysis of the received information.

In accordance with an embodiment, when the determined request type corresponds to the request to contact the user, such as the driver 318, of the car 308, the ECU 402 may be configured to facilitate a secure, two-way communication between the first smartphone 302 and the second smartphone 304, via a wireless communication system of the car 308. The ECU 402 may be configured to communicate the request to the second smartphone 304 via a wireless communication system of the car 308, by use of the cellular communication protocol, such as LTE. The driver 318 may send a custom message, such as "I will move the <car 308> in <5> minutes, please don't impound my car" and/or may send his contact number as per choice, to the first smartphone 302. Alternatively, the driver 318 may send the custom message, such as an SMS, by use of the UI 406, via the second communication protocol. In an instance, the custom message or the contact number may be communicated to the ECU 402, via the second communication protocol. The ECU 402 may receive the custom message, via the wireless communication system (such as the wireless communication system 108) of the car 308. In such an instance, when the parking enforcement officer 118 taps to the ORVM 310 for a second time, the custom message may be further transmitted to the first smartphone 302.

In accordance with an embodiment, the second smartphone 304 may be configured to communicate a permission to the ECU 402 via the wireless communication system of the car 308 and by use of the wireless communication network 114. The permission may be communicated to enable movement of the car 308 from the crowded place to another desired location within a pre-determined distance range, such as within a circumference of 50 meters from the parked location. The permission may be further communicated to the first smartphone 302 under the control of the ECU 402. An update for the new location of the car 308, tracked by the GPS sensor of the car 308, may be communicated by the ECU 402 to the second smartphone 304. Thus, the car 308, particularly the ECU 402 and/or the wireless communication system of the car 308, acts as a gateway to facilitate communication between the first smartphone 302 and the second smartphone 304. Thus, a smart mechanism may be provided that saves time and effort, and increases convenience of both the parking enforcement officer 118 and a user, such as the driver 318, associated with the car 308.

Figure 5:
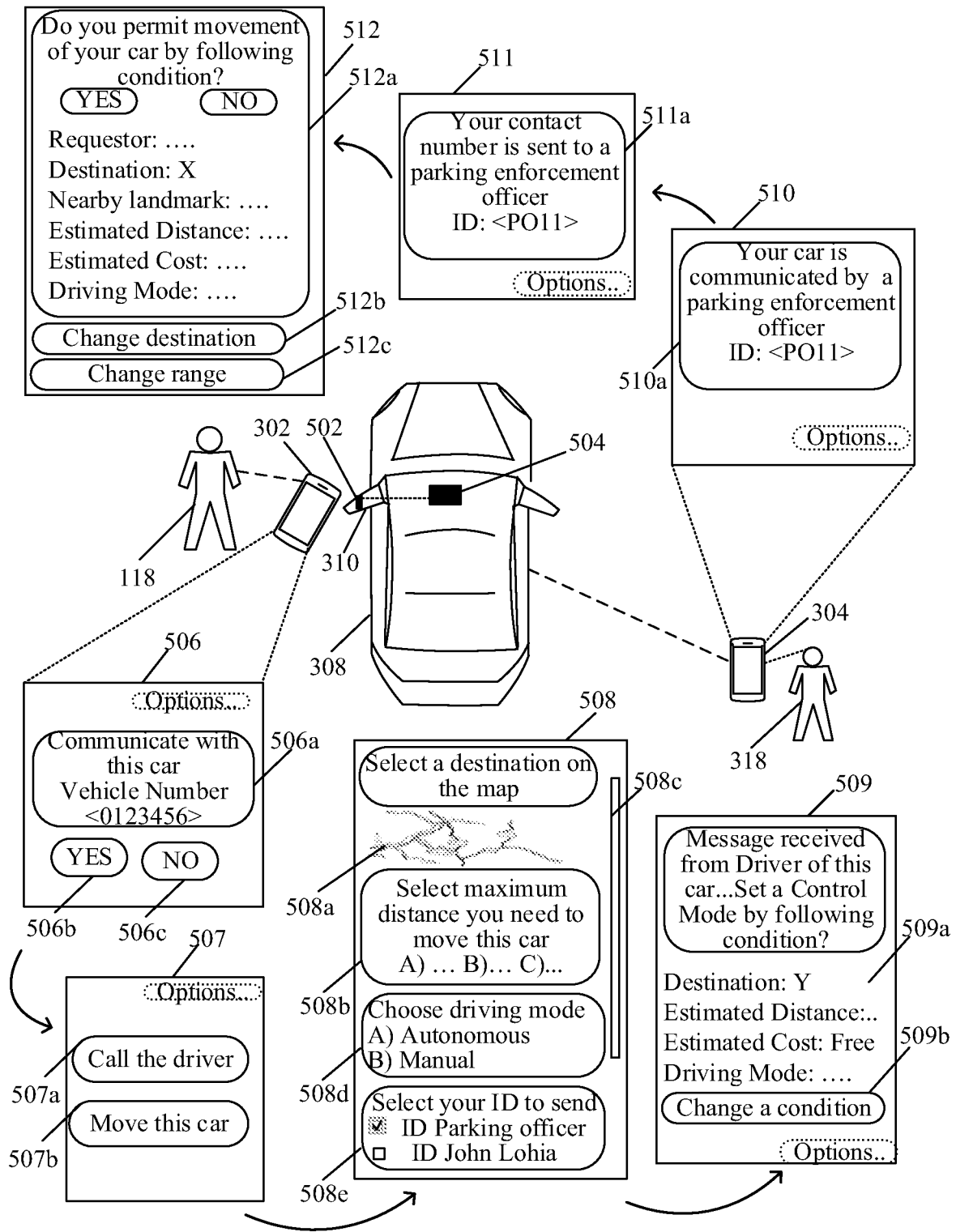
FIG. 5 illustrates a third exemplary scenario for implementation of the disclosed system and method to facilitate communication via an electronic interface of a vehicle, in accordance with an embodiment of the disclosure.

FIG. 5 illustrates a third exemplary scenario for implementation of the disclosed system and method to facilitate communication via an electronic interface of a vehicle, in accordance with an embodiment of the disclosure. FIG. 5 is explained in conjunction with elements from FIGS. 1A, 1B, 2, 3, and 4. With reference to FIG. 5, there is shown a wireless communication system 502 installed at the ORVM 310 of the car 308 and an ECU 504 installed in a dashboard of the car 308. There is further shown an enlarged view of UIs 506 to 509 rendered at the first smartphone 302, and other UIs 510 to 512 rendered at the second smartphone 304.

In accordance with the third exemplary scenario, the first smartphone 302 may be associated with the parking enforcement officer 118. The wireless communication system 502 may correspond to the wireless communication system 108 (FIG. 1A and FIG. 2). The ECU 504 may correspond to the ECU 110 (FIG. 1A and FIG. 2). The UIs 506 to 509 may correspond to the one or more UIs of the requestor application 124. The UIs 510 to 512 may correspond to the one or more UIs of the vehicle user application 126 (as described in FIGS. 1A and 1B). The car 308 may be parked in a parking restricted zone or parked in an undesired manner that may cause inconvenience to other road users. A user, such as the parking enforcement officer 118, may want to contact the driver 318 of the car 308.

In operation, the parking enforcement officer 118 may place the first smartphone 302 near the wireless communication system 502 provided in the ORVM 310. The UI 506 may be rendered at the first smartphone 302, as shown. The UI 506 may display a message, such as "communicate with this car, vehicle number <0123456>", and provide "Yes" or "NO" options to seek confirmation from the parking enforcement officer 118, as illustrated by a UI element 506a, 506b, and 506c of the UI 506. When the parking enforcement officer 118 selects the UI element 506b, such as "Yes", that denotes a request to establish communication with the vehicle 106.

The first smartphone 302 may be configured to communicate the request that may include identity information (ID) of the parking enforcement officer 118 to the ECU 504, via the wireless communication system 502. The ECU 504 may be configured to receive information from the detected first electronic device 102, via the wireless communication system 502. The ECU 504 may be configured to determine a request type based on the receive information that includes the ID of the parking enforcement officer 118. The ECU 504 may be configured to communicate a message to the second smartphone 304, via the wireless communication system 502. The message may be communicated to inform the driver 318 that the car 308 is communicated by the parking enforcement officer 118 with the ID "<PO11>" of the parking enforcement officer 118, as illustrated by the UI element 510a of the UI 510.

Subsequently, the UI 507 may be rendered at the first smartphone 302, as shown. The UI 507 may display various options, such as "call the driver" (as illustrated by a UI element 507a) or "Move this car" (as illustrated by a UI element 507b). In instances when the parking enforcement officer 118 selects the UI element 507a which denotes a request to communicate with the driver 318 of the car 308, the ECU 504 may determine that the information that corresponds to the contact details of the driver 318 is configured as public. In such a case, the ECU 504 may be configured to directly communicate the contact details of the driver 318 to the first smartphone 302, via the wireless communication system 502. In such a case, the ECU 504 may also communicate a message to the second smartphone 304, via the wireless communication system 502, to inform that the contact details of the driver 318 is communicated to the parking enforcement officer 118 with the ID "<PO11>", as illustrated by the UI element 511a of the UI 511. The first smartphone 302 may initiate a calling application at the first smartphone 302 based on the received contact details of the driver 318. In accordance with an embodiment, the received contact number of the driver 318 and/or the name of the driver 318 may be displayed at the first smartphone 302 while the call is placed. Alternatively, in accordance with an embodiment, the received contact number of the driver 318 may be concealed and may not be displayed while the call is placed. The name of the driver 318 may be displayed at the first smartphone 302.

In instances when the parking enforcement officer 118 selects the UI element 507b which denotes a request to move the car 308, the UI 508 may be rendered at the first smartphone 302 of the parking enforcement officer 118. The parking enforcement officer 118 may select a destination to move the car 308 by use of a map displayed on the UI 508, as illustrated by a UI element 508a. Various options of distance range, such as "0-50 meter", "50-200 meter", "200 meter", may be displayed on the UI 508 to allow the parking enforcement officer 118 to select a maximum distance to move the car 308 from the current location of the car 308 to a desired destination location, as illustrated by the UI element 508b. The UI 508 may be navigated by use of a scroll bar 508c, in an example. The parking enforcement officer 118 may further select a driving mode to move the car 308, as illustrated by the UI element 508d. The parking enforcement officer 118 may further select the ID (that is to be communicated) associated with the parking enforcement officer 118, as illustrated by the UI element 508e.

The first smartphone 302 may communicate the information that includes the preferences (such as the selected options) to request a permission from the driver 318 to move the car 308. The communicated information may include the 10 of the parking enforcement officer 118, the selected options, such as the destination location, the maximum distance range, and the driving mode preference. In accordance with an embodiment, the first smartphone 302 may communicate the information to the ECU 504, via the wireless communication system 502 by use of the NFC protocol, or BLUETOOTH™, or other short-range wireless communication protocol. Alternatively, in accordance with an embodiment, the first smartphone 302 may communicate the information to the second smartphone 304, by use of the cellular communication protocols, such as LTE, or other wireless communication protocols of the wireless communication network 114. The second smartphone 304 may be configured to display the received information related to the permission to move the car 308, as illustrated by the UI element 512a of the UI 512. The driver 318 may select one or more options via the UI 512 to change preferences, such as to change a destination location, as illustrated by a UI 512b, or to change the range of distance to move the car 308, as illustrated by a UI element 512c of the UI 512.

In accordance with an embodiment, the second smartphone 304 may communicate a response to the ECU 504 via the wireless communication system 502 of the car 308. In instances when the response indicates that the requested conditions to move the car 308 is accepted (such as selection of "Yes" from UI 512) by the driver 318, a control mode that corresponds to the requested conditions (or preferences) is set at the ECU 504. The ECU 504 may be configured to further communicate one or more commands associated with the permission to another ECU, such as the powertrain control system 212, to enable ignition and autonomous driving mode to move the car 308 to the set destination within the set distance range.

In accordance with an embodiment, the second smartphone 304 may communicate a response directly to the first smartphone 302. In such an embodiment, the received response may be sent to the ECU 504 via the wireless communication system 502 of the car 308, such as by a tap on the ORVM 310. The control mode that corresponds to the requested conditions (or preferences) may then be set at the ECU 504 for autonomous movement the car 308, as described above.

In instances when the response indicates that the requested conditions to move the car 308 is changed (such as selection of the UI element 512b from UI 512) by the driver 318, a control mode that corresponds to the requested changed conditions set at the ECU 504. The ECU 504 may communicate the response that indicates that the requested conditions to move the car 308 is changed to the first smartphone 302. The received response that indicates that the requested conditions to move the car 308 is changed may be displayed at the first smartphone 302 via the UI 509, as illustrated by a UI element 509a of the UI 509. The parking enforcement officer 118 may further choose to change a condition related to movement of the car 308 by use of a UI element 509b of the UI 509, as shown. Thus, a smart mechanism may be provided that saves time, effort, and increases convenience of both the parking enforcement officer 118 and the driver 318 of the car 308.

FIGS. 6A to 6G collectively depict a flow chart that illustrates an exemplary method to facilitate communication via an electronic interface of a vehicle, in accordance with an embodiment of the disclosure. With reference to FIGS. 6A to 6G, there is shown a flow chart 600. The flow chart 600 is described in conjunction with FIGS. 1A, 1B, 3, 4, and 5. The method may be implemented in the ECU 110. The method starts at step 602 and proceeds to step 604.

At step 604, the first electronic device 102 may be detected within a first proximity range of the wireless communication system 108 of the vehicle 106. For example, the first electronic device 102 may establish communication with the vehicle 106, by use of the UI 124c (FIG. 1B) of the requestor application 124, when the first electronic device 102 is placed near the wireless communication system 108. Other examples of the UIs includes the UI 404 (FIG. 4), and/or the UI 506 (FIG. 5) that may be used to establish communication between the first smartphone 302 (an example of the first electronic device 102) and the car 308, such as the wireless communication system 502 (FIG. 5) of the car 308.

At step 606, information from the first electronic device 102 may be received by the ECU 110 via the wireless communication system 108 via the in-vehicle network 222. The information may be received when the first electronic device 102 is in the first proximity range by use of the first communication protocol. For example, as described in FIG. 3, the NFC device 312 (an example of the wireless communication system 108) receives the electronic fliers 322a, 322b and 322c. The electronic fliers 322a, 322b and 322c may be received when the flier distributor 120 places the first smartphone 302 near the ORVM 310 that comprises the NFC device 312 to activate communication via the NFC protocol. In this case, the first smartphone 302 may use the UI 322 (FIG. 3) to select the electronic fliers 322a, 322b and 322c to be communicated to the ECU 314 via the NFC device 312. In another example, as described in FIG. 4, when the first smartphone 302 is detected within the first proximity range to the ECU 402, the ECU 402 receives information from the first smartphone 302. The information may be received by use of the first communication protocol, such as the NFC protocol. The received information may comprise an identifier of the first smartphone 302, identity information of the parking enforcement officer 118, and the request to contact a user, such as the driver 318, of the car 308.

At step 608, the received information may be analyzed based on pre-configured preferences of a user, such as the vehicle user 122, associated with the vehicle 106. For instance, the preferences may be pre-configured by the vehicle user 122 by use of the UI 208a (FIG. 2) that may be rendered on the display 208. The UI 208a may be an application-based UI associated with the ECU 110 of the vehicle 106.

At step 610, a request type may be determined based on the analysis of the received information. One or more corresponding actions may be performed based on the analysis of the received information. In an instance when the determined request type corresponds to a request to communicate with the vehicle user 122, associated with the vehicle 106, the control passes to step 612 (FIG. 6B). In an instance when the determined request type corresponds to a request to issue an electronic parking ticket for the vehicle 106, associated with the vehicle 106, the control passes to step 622 (FIG. 6C). In an instance when the determined request type corresponds to a request to check an electronic parking receipt, the control passes to step 640 (FIG. 6D). In an instance when the determined request type corresponds to a request to communicate an electronic flier to the vehicle 106, the control passes to step 654 (FIG. 6E). In an instance when the determined request type corresponds to a request to move the vehicle 106 from a first location to a second location, the control passes to step 662 (FIG. 6F). In an instance when the determined request type corresponds to a notice that indicates parking violation, the control passes to step 676 (FIG. 6G).

Figure 6A:
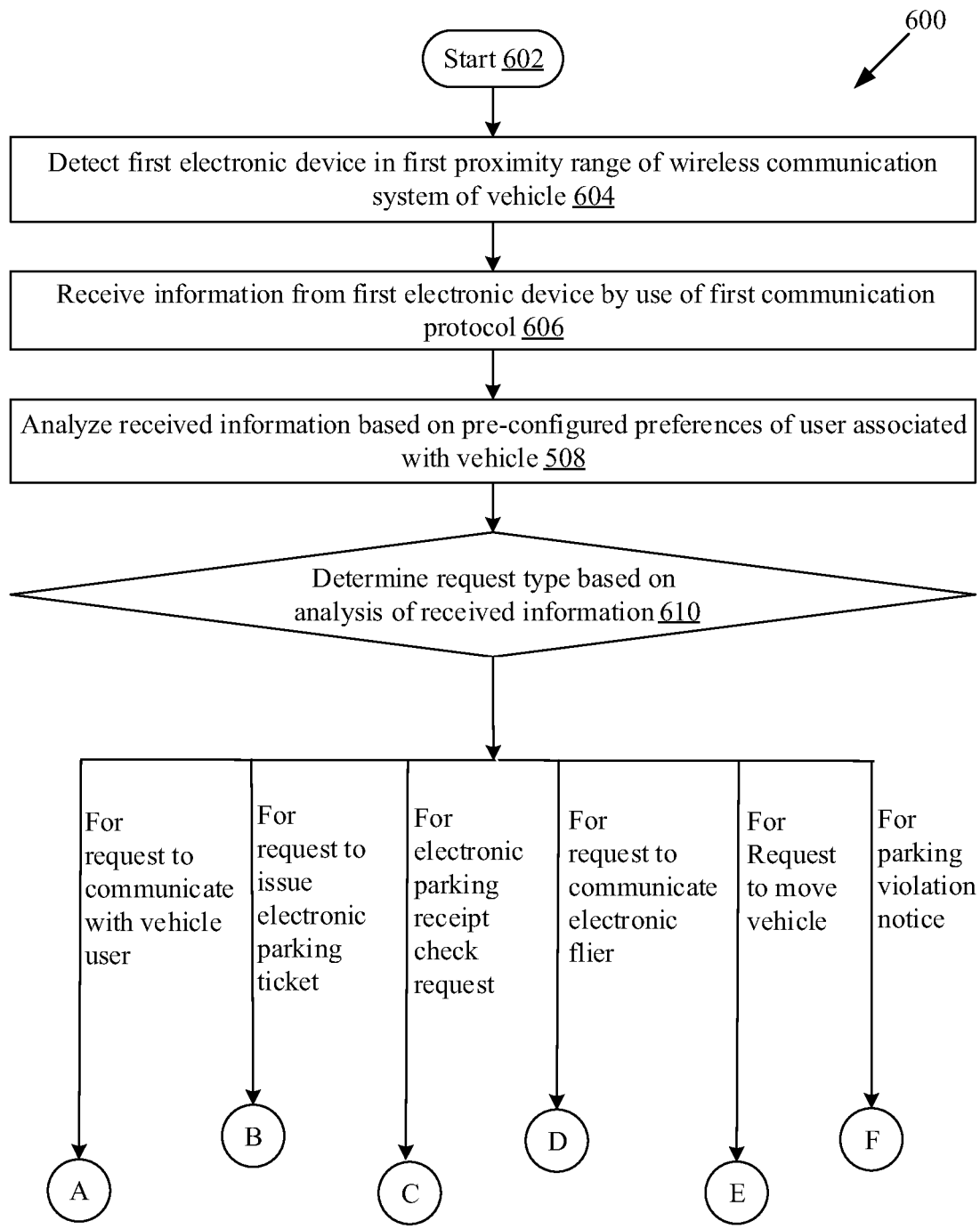
FIGS. 6A to 6G collectively depict a flow chart that illustrates an exemplary method to facilitate communication via an electronic interface of a vehicle, in accordance with an embodiment of the disclosure.
Figure 6B:
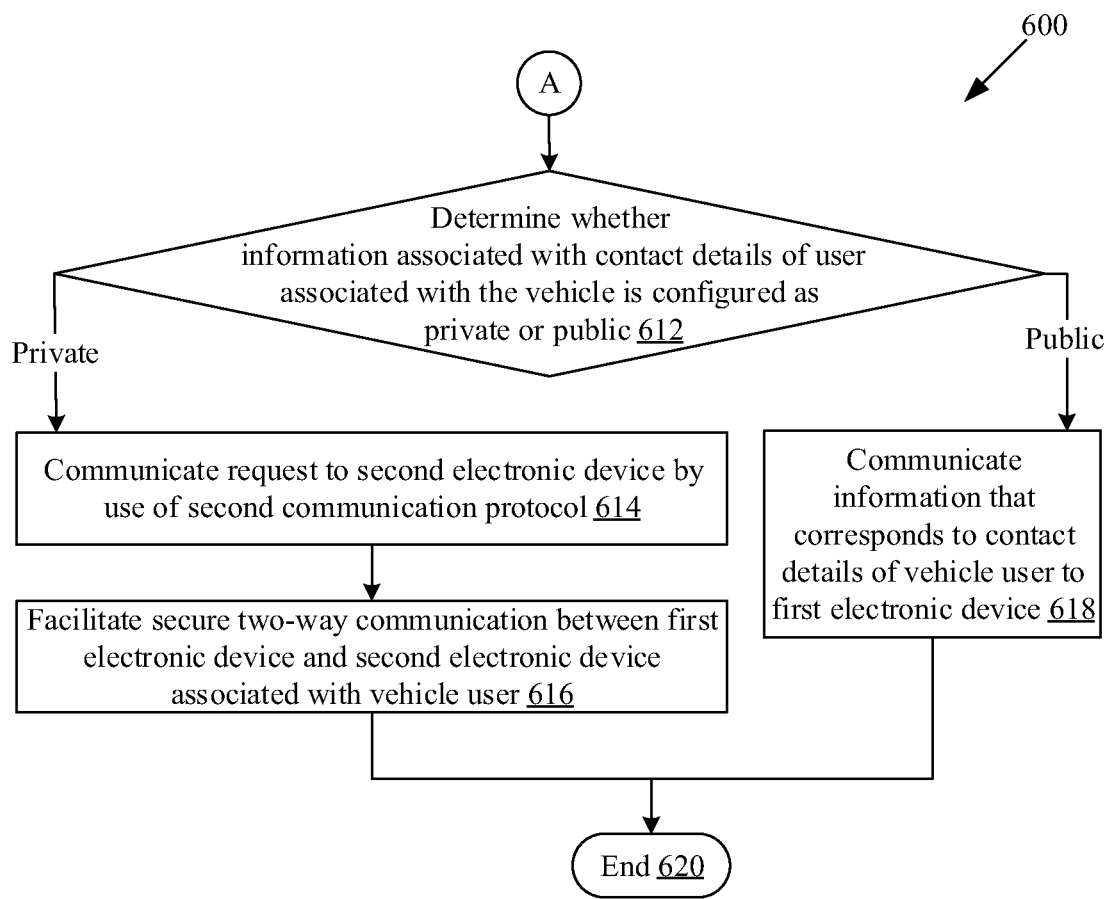
Figure 6C:
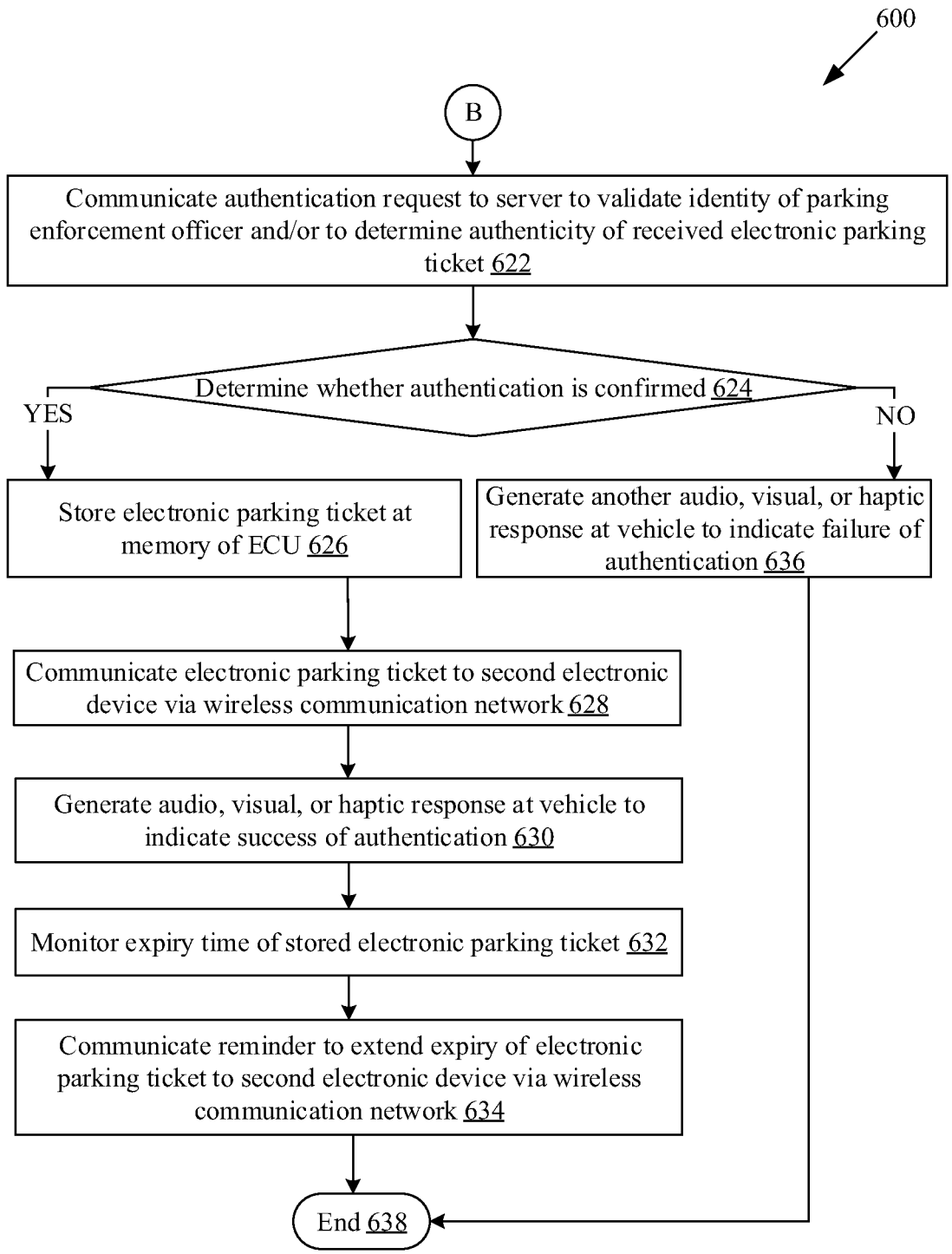
Figure 6D:
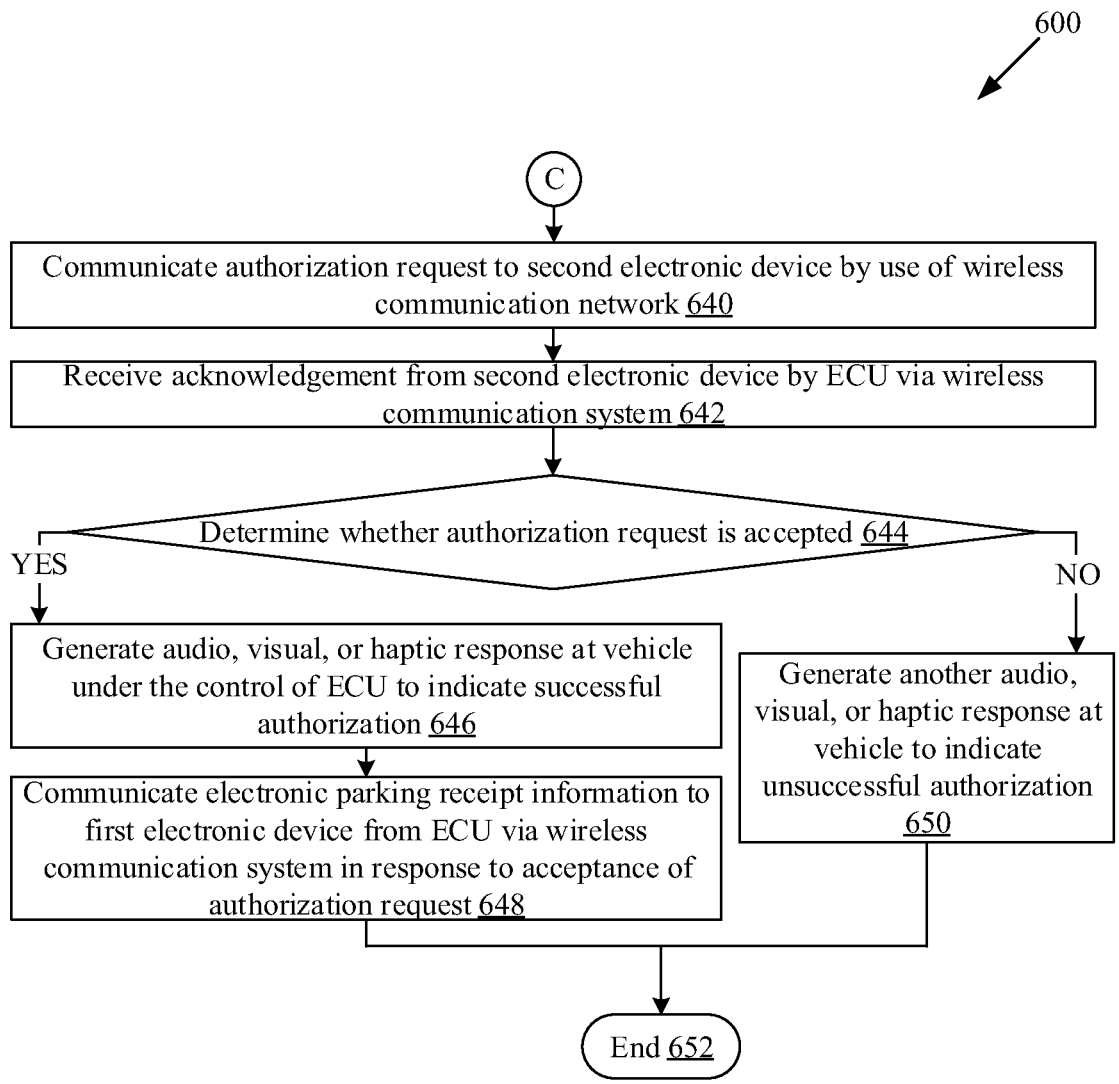
Figure 6E:
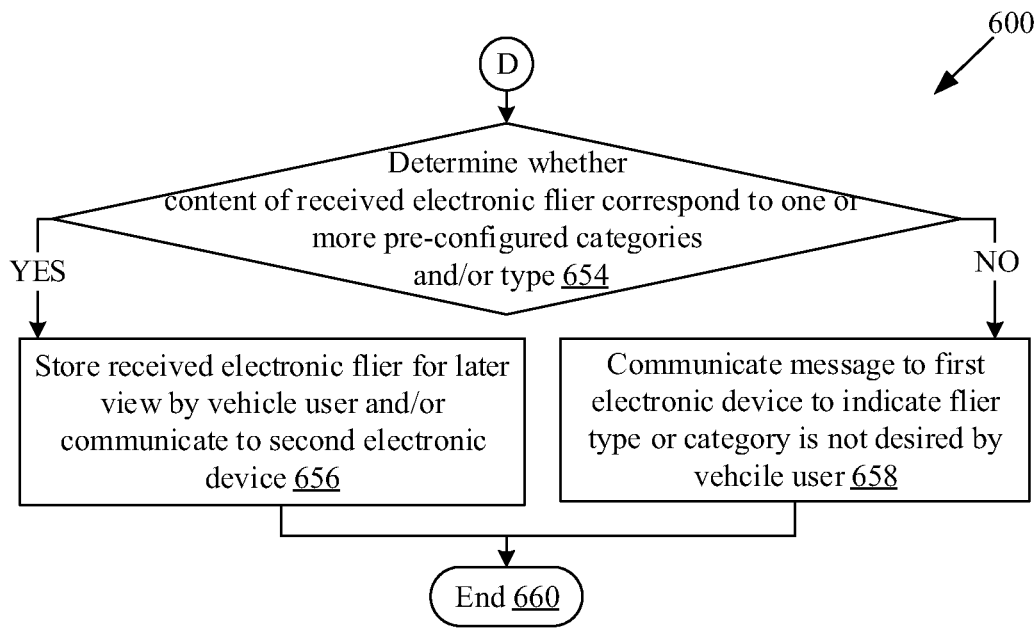
Figure 6F:
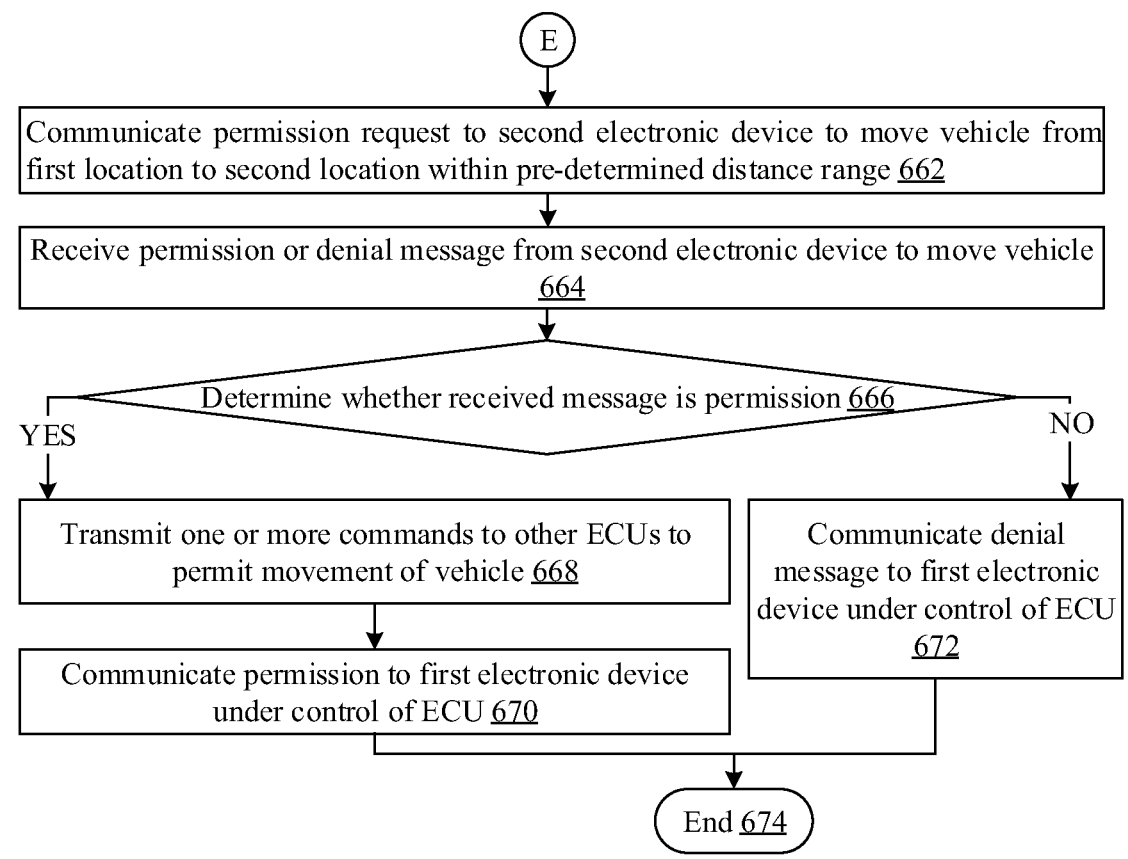
Figure 6G:
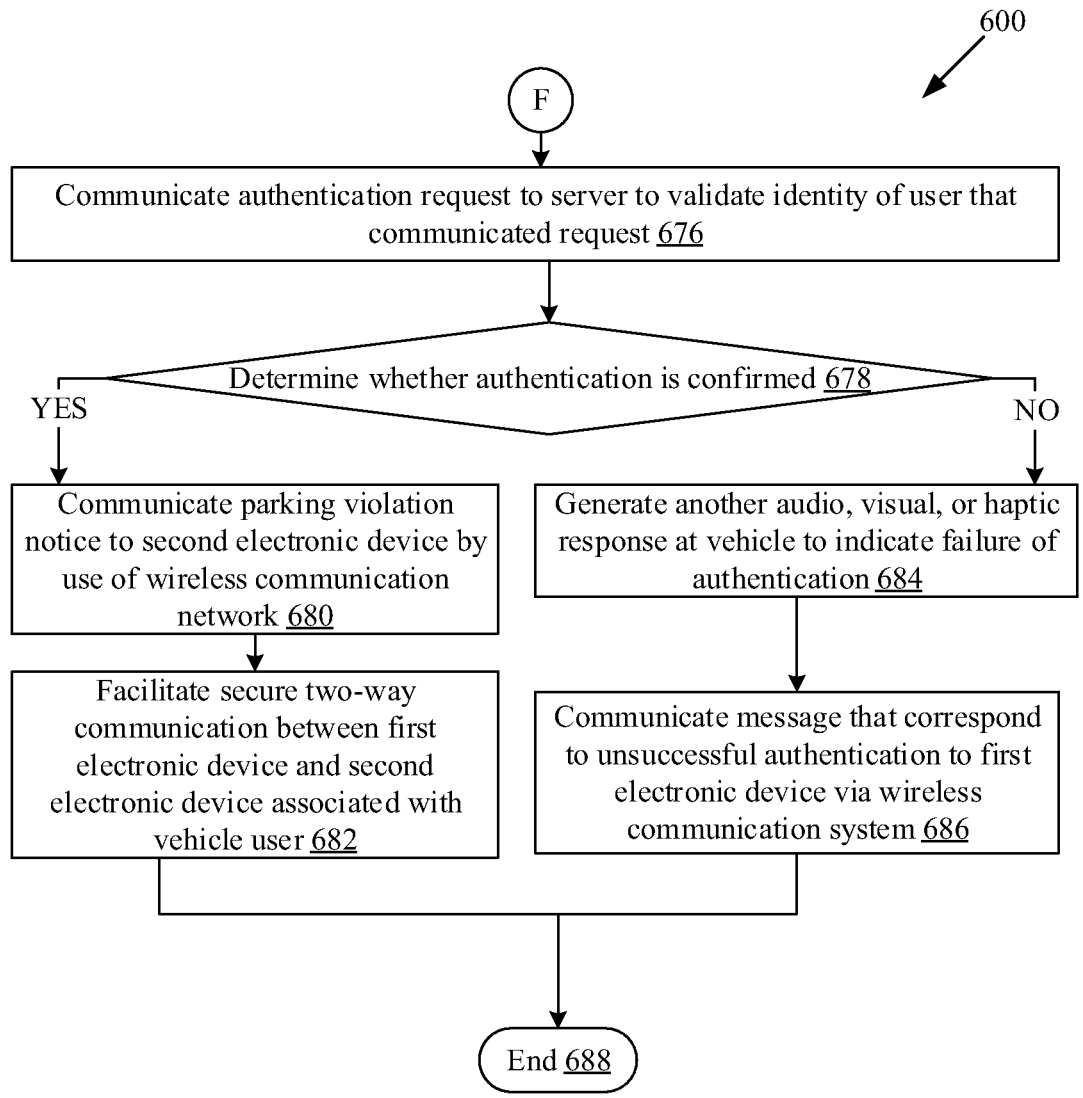

With reference to FIG. 6B, an instance when the determined request type corresponds to a request to communicate with the vehicle user 122, the control is received at step 612 from step 610 (FIG. 6A). At step 612, it may be determined whether the information associated with contact details of the user, such as the vehicle user 122 associated with the vehicle 106, is configured as private. In an instance when the information that corresponds to the contact details is configured as private, the control passes to step 614. In an instance when the information that corresponds to the contact details is configured as public, the control passes to step 618.

At step 614, the request may be communicated to the second electronic device 104, by use of the second communication protocol (such as LTE). The second electronic device 104 may be within the second proximity range of the ECU 110 of the vehicle 106. An example of the information that is displayed at the second electronic device 104, may be exemplified by the UI 126a (FIG. 1B). The displayed information, as illustrated by the UI element 162 of the UI 126a, may be information of the requestor that is received at the second electronic device 104. When the UI element 162 is selected by the requestor, such as the vehicle user 122, information of the requestor is displayed, as illustrated in the UI 126b (FIG. 1B). When the UI element 164 is selected by the vehicle user 122, vehicle status related information such as location or door lock/unlock status of the vehicle 106 is displayed, as illustrated by the UI element 172 of the UI 126c (FIG. 1B). In another example, as described in FIG. 4, and illustrated by the UI 406, the driver 318 may send a custom message, such as "I will move the <car 308> in <5> minutes, please don't impound my car" and/or may send his contact number as per choice, to the first smartphone 302. Alternatively, the driver 318 may send the custom message, such as an SMS, by use of the UI 406, via the second communication protocol.

At step 616, a secure, two-way communication may be facilitated between the first electronic device 102 and the second electronic device 104, associated with the vehicle user 122. The secured, two-way communication may be facilitated by the ECU 110 via the wireless communication system 108. In accordance with an embodiment, the secure, two-way communication may be facilitated directly between the second electronic device 104 and the first electronic device 102, based on the request received from the ECU 110. The secure, two-way communication may enable the exchange of custom messages, contact details, and/or other data by use of the requestor application 124 and the vehicle user application 126.

At step 618, the information associated with contact details of the vehicle user 122 may be communicated to the first electronic device 102 (as shown in UI 124e of FIG. 1B). The information that corresponds to the contact details pre-stored at the vehicle 106 may be communicated, via the communication channel 112. In such a case, the ECU 110 may also communicate a message to the second electronic device 104, via the wireless communication system 108, to inform that the contact details of the vehicle user 122 is communicated to the requestor. For example, as described in FIG. 5 and illustrated by the UI 511, the ECU 504 (an example of the ECU 110) communicates a message to the second smartphone 304, via the wireless communication system 502, to inform that the contact details of the driver 318 is communicated to the parking enforcement officer 118 with the ID "<PO11>", as illustrated by the UI element 511a of the UI 511. The control may pass to end step 620.

With reference to FIG. 6C, in an instance when the determined request type corresponds to a request to issue an electronic parking ticket for the vehicle 106, the control is received at step 622 from step 610 (FIG. 6A). At step 622, an authentication request may be communicated to a server, such as the server 116. The authentication request may be communicated to validate the identity of the parking enforcement officer 118, and/or to determine authenticity of the received electronic parking ticket. At step 624, whether the authentication is confirmed may be determined. In an instance when the authentication is successful, the control passes to step 626. And in an instance when the authentication is unsuccessful, the control passes to step 636.

At step 626, the electronic parking ticket may be stored at the memory 204 (of the vehicle 106). At step 628, the electronic parking ticket may be communicated to the second electronic device 104, via the wireless communication network 114 (such as via LTE protocol). At step 630, an audio, visual, or haptic response may be generated at the vehicle 106, such as at a light indicator of an ORVM of the vehicle 106. The generation of the audio, visual, or haptic response may indicate success or failure related to the storage of the electronic parking ticket and receipt by the second electronic device 104.

At step 632, an expiry time of the stored electronic parking ticket may be monitored. At step 634, a reminder to extend expiry of the electronic parking ticket may be communicated to the second electronic device 104, via the wireless communication network 114. The second electronic device 104 may display the expiry time via the vehicle user application 126. At step 636, another audio, visual, or haptic response may be generated at the vehicle 106 to indicate failure of the authentication. The control may pass to end step 638.

With reference to FIG. 6D, in an instance when the determined request type corresponds to a request to check an electronic parking receipt, the control is received at step 640 from step 610 (FIG. 6A). At step 640, an authorization request may be communicated to the second electronic device 104, via the wireless communication network 114. At step 642, an acknowledgement from the second electronic device 104 may be received by the ECU 110.

At step 644, whether the authorization request is accepted may be determined. In an instance when the authorization request is accepted, the control passes to step 646. In an instance when the authorization request is rejected, the control passes to step 650. At step 646, an audio, visual, or haptic response may be generated at the vehicle 106 under the control of the ECU 110, to indicate successful authorization.

At step 648, the electronic parking receipt information may be communicated to the first electronic device 102 from the ECU 110, in response to the acceptance of the authorization request. At step 650, another audio, visual, or haptic response may be generated at the vehicle 106 under the control of the ECU 110, to indicate unsuccessful authorization. The control passes to the end step 652.

With reference to FIG. 6E, in an instance when the determined request type corresponds to a request to communicate an electronic flier to the vehicle 106, the control passes to the step 654 from the step 610 (FIG. 6A). At step 654, whether content of the received electronic flier corresponds to one or more pre-configured categories and/or types of information may be determined. The one or more pre-configured categories and/or types of information may refer to the topics that are of interest to the vehicle user 122.

In an instance when the content of the received electronic flier is determined to be similar or within a domain of the pre-configured categories and/or types of information, the control passes to step 656. In an instance when the content of the received electronic flier is determined to be dissimilar or not within a domain of the pre-configured categories and/or types of information, the control passes to step 658. At step 656, the received electronic flier may be stored for later view by the vehicle user 122 and/or communicated to the second electronic device 104 (such as shown in UI 324 and 326 of FIG. 3). At step 658, the received electronic flier may not be stored at the vehicle 106. The control may pass to end step 660.

With reference to FIG. 6F, in an instance when the determined request type corresponds to a request to move the vehicle 106 from a first location to a second location, the control passes to the step 662 from the step 610 (FIG. 6A). At step 662, a permission request may be communicated to the second electronic device 104. In accordance with an embodiment, the permission request may be communicated to the second electronic device 104 from the ECU 110, via the wireless communication system 108. Alternatively, the permission request may also be communicated to the second electronic device 104 directly from the first electronic device 102 when the contact details of the second electronic device 102 is previously received. For example, as described in FIG. 5, and as illustrated by the UI 508, the communicated information may include the selected options, such as the destination location, the maximum distance range, the driving mode preference, and the selected ID of the parking enforcement officer 118, as illustrated by the UI elements 508a to 508e of the UI 508. In such a case, the second smartphone 304 (an example of the second electronic device 104) may be configured to display the received information related to the permission to move the car 308, as illustrated by the UI element 512a of the UI 512. The driver 318 may select one or more options via the UI 512 to change preferences, such as to change a destination location, as illustrated by a UI 512b, or to change the range of distance to move the car 308, as illustrated by a UI element 512c of the UI 512. The second smartphone 304 then may communicate a response (such as on selection of "Yes" or "NO" from UI 512) to the ECU 504 (an example of the ECU 110) via the wireless communication system 502 of the car 308.

At step 664, a permission or denial message may be received to move the vehicle 106 to the second location within a pre-determined distance range. At step 666, whether the received message indicates permission to move the vehicle 106 may be determined. In an instance when the received command indicates a permission to move the vehicle 106, the control may pass to step 668. In an instance when the received command indicates a denial to move the vehicle, the control may pass to step 672.

At step 668, one or more commands may be transmitted to one or more other ECUs, such as the body control module 220. The commands may include the ability to unlock a locked door of the vehicle 106, and/or enable vehicle ignition. In an example, as described in FIG. 5, the control mode that corresponds to the requested conditions (or preferences) may then be set at the ECU 504 (an example of the ECU 110) for autonomous movement the car 308 (an example of the vehicle 106), as described above.

At step 670, the permission to move the vehicle 106 may be further communicated to the first electronic device 102, under the control of the ECU 110. For example, as described in FIG. 5, when the received response that indicates that the requested conditions to move the car 308 is changed may be displayed at the first smartphone 302 via the UI 509, as illustrated by a UI element 509a of the UI 509. At step 672, a denial message may be further communicated to the first electronic device 102, under the control of the ECU 110. The control may then pass to the end step 674.

With reference to FIG. 6G, in an instance when the determined request type corresponds to a notice that indicates parking violation, the control passes to step 676 from the step 610 (FIG. 6A). At step 676, an authentication request may be communicated to a server, such as the server 116. The authentication request may be communicated to validate the identity of a user that communicated the request, such as an enforcement officer. At step 678, whether the authentication is confirmed may be determined. In an instance when the authentication is successful, the control passes to step 680. In an instance when the authentication is unsuccessful, the control passes to the step 684.

At step 680, the parking violation notice may be communicated to the second electronic device 104, via the wireless communication network 114. At step 682, a secure, two-way communication may be facilitated between the first electronic device 102 and the second electronic device 104, associated with the vehicle user 122. The secured, two-way communication may be facilitated by the ECU 110 via the wireless communication system 108.

At step 684, another audio, visual, or haptic response may be generated at the vehicle 106 to indicate failure of the authentication by use of the audio interface 206, the display 208, or one or more indicators provided at the ORVM 210 (FIG. 2). At step 686, a message that corresponds to unsuccessful authentication may be communicated to the first electronic device 102. The control may pass to end step 688.

In accordance with an embodiment of the disclosure, a system for communication with a first electronic device (such as the first electronic device 102 or the first smartphone 302) via an electronic interface of a vehicle is disclosed. The system (such as the ECU 110 (FIG. 1A) may comprise one or more circuits (hereinafter referred to as the microprocessor 202 (FIG. 2). The microprocessor 202 may be configured to receive information from the first electronic device 102 (FIG. 1A) by use of the first communication protocol via the electronic interface. The first electronic device 102 may be in a first proximity range of the electronic interface (such as the wireless communication system 108 (FIG. 1A) or the wireless communication system 502 (FIG. 5) of the vehicle 106 (FIG. 1A). The microprocessor 202 may be configured to perform one or more corresponding actions, based on the received information and a preference of a user (such as the vehicle user 122) associated with the vehicle 106.

In accordance with an embodiment of the disclosure, a vehicle (such as the vehicle 106 (FIGS. 1A and 2)) is disclosed. The vehicle 106 may comprise the battery 224, an electronic interface (such as the wireless communication system 108 (FIGS. 1A and 2)) powered by the battery 224, and an electronic control unit (ECU) (such as the ECU 110 (FIGS. 1A and 2). The ECU may be communicatively coupled with the electronic interface to communicate with one or more external devices via the electronic interface of the vehicle 106. The ECU may comprise one or more circuits (hereafter referred to as the microprocessor 202 (FIG. 2)). The microprocessor 202 may be configured to receive information from the first electronic device 102 (FIG. 1) that corresponds to one of the one or more external devices by use of a first communication protocol via the electronic interface. The first electronic device may be in a first proximity range of the electronic interface. The microprocessor 202 may be configured to perform one or more corresponding actions based on the received information and a preference of a user (such as the vehicle user 122) associated with the vehicle 106.

Various embodiments of the disclosure may provide a non-transitory computer readable medium and/or storage medium having stored thereon, a set of computer-executable instructions for causing a machine and/or a computer to facilitate communication via an electronic interface, such as the wireless communication system 108 (FIGS. 1A and 2), of a vehicle (such as the vehicle 106). The set of computer-executable instructions in an ECU, such as the ECU 110, may cause the machine and/or computer to perform the steps that comprise receipt of information from the first electronic device 102 (FIG. 1A) by the ECU 110 via the electronic interface of the vehicle 106 (FIG. 1A). The information may be received by use of the first communication protocol. The first electronic device 102 may be in a first proximity range of the electronic interface of the vehicle 106. One or more corresponding actions may be performed, by the ECU 110, based on the received information and a preference of a user (such as the vehicle user 122) associated with the vehicle 106.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A communication system, comprising:
 a portable electronic device configured to:
  render a first User Interface (UI);
  receive a first input from a first user by said first UI, wherein said first user is associated with said portable electronic device; and
  set requestor information based on said received first input, wherein said set requestor information indicates a type, a name, and a unique identifier (ID) associated with said first user;
 an electronic interface in a vehicle, wherein said electronic interface is configured to communicate with said portable electronic device;
 a display screen of said vehicle; and
 a first electronic control unit (ECU) of said vehicle, wherein
  said first ECU is configured to:
   control said display screen to render a second UI;
   receive a second input from a second user by said second UI, wherein said second user is associated with said vehicle;
   select a plurality of categories of information based on said received second input;

receive external information from said portable electronic device via said electronic interface, wherein said external information includes said requestor information, and
said portable electronic device is in a specific proximity range of said electronic interface;
generate, as an output signal, at least one of an audio signal, a visual signal, or a haptic response, wherein said output signal indicates success of receipt of said external information from said portable electronic device;
determine content of said received external information corresponds to at least one category of information of said selected plurality of categories of information;
store said received external information based on said determination that said content of said received external information corresponds to said at least one category of information of said selected plurality of categories of information;
determine an action related to at least one component of said vehicle, based on said received external information and a preference of said second user;
receive a response associated with said action from a communication device of said second user based on a request communicated to said second user;
determine whether said response indicates permission to execute said action; and
communicate a command to a second electronic control unit (ECU) of said vehicle based on said response that indicates said permission, and
said second ECU is configured to control execution of said action based on said command.

2. The communication system according to claim 1, wherein said received external information comprises at least one of:
an identifier of said portable electronic device;
contact information associated with said portable electronic device;
an electronic parking ticket;
an electronic flier;
an electronic parking receipt; or
a custom message for said second user.

3. The communication system according to claim 1, wherein
said first ECU is further configured to utilize a first communication protocol for communication with said portable electronic device, and
said first communication protocol is one of a near field communication (NFC) protocol or a communication protocol compliant with BLUETOOTH™ protocol.

4. The communication system according to claim 1, wherein said first ECU is further configured to analyze said received external information based on said preference of said second user.

5. The communication system according to claim 4, wherein said first ECU is further configured to:
determine, based on said analysis of said received external information, at least a request type; and
communicate, based on said at least request type, with said second user.

6. A communication method, comprising:
rendering a first User Interface (UI) by a portable electronic device associated with a first user;
receiving, by said portable electronic device, a first input from said first user by said first UI;
setting, by said portable electronic device, requestor information based on said received first input, wherein said set requestor information indicates a type, a name, and a unique identifier (ID) associated with said first user;
controlling, by a first electronic control unit (ECU) of a vehicle, a display screen of said vehicle to render a second UI;
receiving, by said first ECU, a second input from a second user by said second wherein said second user is associated with said vehicle;
selecting, by said first ECU, a plurality of categories of information based on said received second input;
receiving, by said first ECU, external information from said portable electronic device via an electronic interface of said vehicle, wherein
said external information includes said set requestor information, and
said portable electronic device is in a specific proximity range of said electronic interface;
generating, by said first ECU, at least one of an audio signal, a visual signal, or a haptic response, as an output signal, wherein said output signal indicates success of receipt of said external information from said portable electronic device;
determining, by said first ECU, content of said received external information corresponds to at least one category of information of said selected plurality of categories of information;
storing, by said first ECU, said received external information based on said determination that said content of said received external information corresponds to said at least one category of information of said selected plurality of categories of information;
determining, by said first ECU, an action related to at least one component of said vehicle, based on said received external information and a preference of said second user;
receiving, by said first ECU, a response associated with said action from a communication device of said second user based on a request communicated to said second user;
determining, by said first ECU, whether said response indicates permission to execute said action;
communicating, by said first ECU, a command to a second electronic control unit (ECU) of said vehicle based on said response that indicates said permission; and
controlling, by said second ECU, execution of said action based on said command.

7. A vehicle, comprising:
an electronic interface;
a battery configured to power said electronic interface;
a display screen; and
a first electronic control unit (ECU) coupled with said electronic interface to communicate with at least one external device associated with a first user, wherein said first ECU is configured to:
control said display screen to render a User Interface (UI);
receive a first input from a second user by said UI, wherein said second user is associated with said vehicle;
select a plurality of categories of information based on said received first input;
receive, external information from a portable electronic device of said at least one external device via said electronic interface, wherein said external information includes requestor information, said portable electronic device is in a specific proximity range of said electronic interface, said requestor information is based on a second input of said first user on said portable electronic device, said requestor information indicates a type, a name, and a unique identifier (ID) associated with said first user;

generate, as an output signal, at least one of an audio signal, a visual signal, or a haptic response, wherein said output signal indicates success of receipt of said external information from said portable electronic device;

determine content of said received external information corresponds to at least one category of information of said selected plurality of categories of information;

store said received external information based on said determination that said content of said received external information corresponds to said at least one category of information of said selected plurality of categories of information;

determine an action related to at least one component of said vehicle, based on said received external information and a preference of said second user associated with said vehicle;

receive a response associated with said action from a communication device of said second user based on a request communicated to said second user;

determine whether said response indicates permission to execute said action; and communicate a command to a second electronic control unit (ECU) of said vehicle based on said response that indicates said permission, and said second ECU is configured to control execution of said action based on said command.

* * * * *